(12) United States Patent  (10) Patent No.: US 7,616,792 B2
Okada et al.  (45) Date of Patent: Nov. 10, 2009

(54) SCALE SELECTION FOR ANISOTROPIC SCALE-SPACE: APPLICATION TO VOLUMETRIC TUMOR CHARACTERIZATION

(75) Inventors: Kazunori Okada, Plainsboro, NJ (US); Dorin Comaniciu, Princeton Jct., NJ (US); Arun Krishnan, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1044 days.

(21) Appl. No.: 10/990,888

(22) Filed: Nov. 17, 2004

(65) Prior Publication Data

US 2005/0135663 A1   Jun. 23, 2005

Related U.S. Application Data

(60) Provisional application No. 60/523,129, filed on Nov. 18, 2003.

(51) Int. Cl.
*G06K 9/00* (2006.01)
*H03F 1/26* (2006.01)

(52) U.S. Cl. ........................ 382/128; 702/189
(58) Field of Classification Search ........................ None
See application file for complete search history.

(56) References Cited

U.S. PATENT DOCUMENTS

2003/0068082 A1* 4/2003 Comaniciu et al. .......... 382/162

FOREIGN PATENT DOCUMENTS

EP         1225544 A2   7/2002

OTHER PUBLICATIONS

Laptev et al., "Space-time Interest Points", Oct. 2003.*
Lindeberg et al., "Real-Time Scale Selection in Hybrid Multi-scale Representations", Jun. 2003.*
Lindeberg, "Feature Detection with Automatic Scale Selection", 1998.*
Okada Kazunori et al: "Scale selection for an anisotropic scale-space: Application to volumetric tumor characterization" Proc IEEE Comput Soc Conf Comput Vision Pattern Recognit; Proceedings of the IEEE Computer Society Conference on Computer Vision and Pattern Recognition; Proceedings of the 2004 IEEE Computer Society Conference on Computer Vision and Patten Recognit, vol. 1, 2004, pp. 1594-1601, XP002322547 the whole document.
Tony Lindeberg: "Scale-Space Theory in Computer Vision" 1994, Kluwer Academic Publishers, XP002323529 Chapter 15: "Non-uniform" smoothing.

* cited by examiner

*Primary Examiner*—Bhavesh M Mehta
*Assistant Examiner*—Soo Jin Park
(74) *Attorney, Agent, or Firm*—David B. Paschburg; F. Chau & Associates, LLC

(57) ABSTRACT

A method for determining a structure in volumetric data includes determining an anisotropic scale-space for a local region around a given spatial local maximum, determining L-normalized scale-space derivatives in the anisotropic scale-space, and determining the presence of noise in the volumetric data and upon determining noise in the volumetric data, determining the structure by a most-stable-over-scales determination, and upon determining noise below a desirable level, determining the structure by one of the most-stable-over-scales determination and a maximum-over-scales determination.

7 Claims, 16 Drawing Sheets

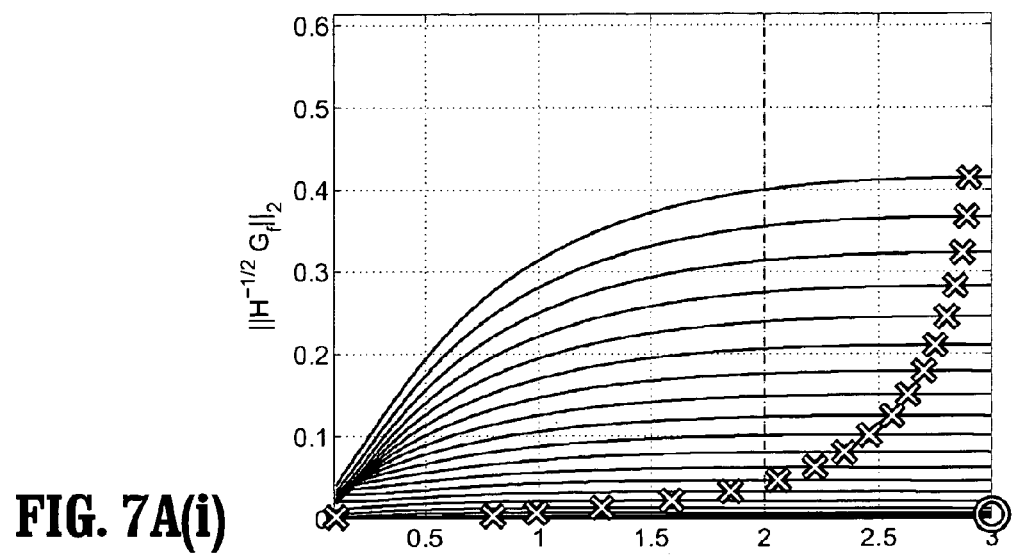
FIG. 7A(i)
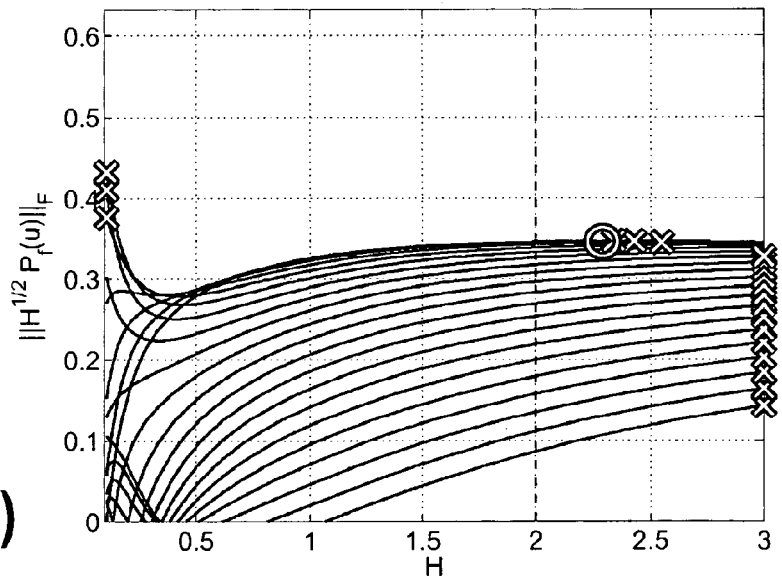
FIG. 7A(ii)
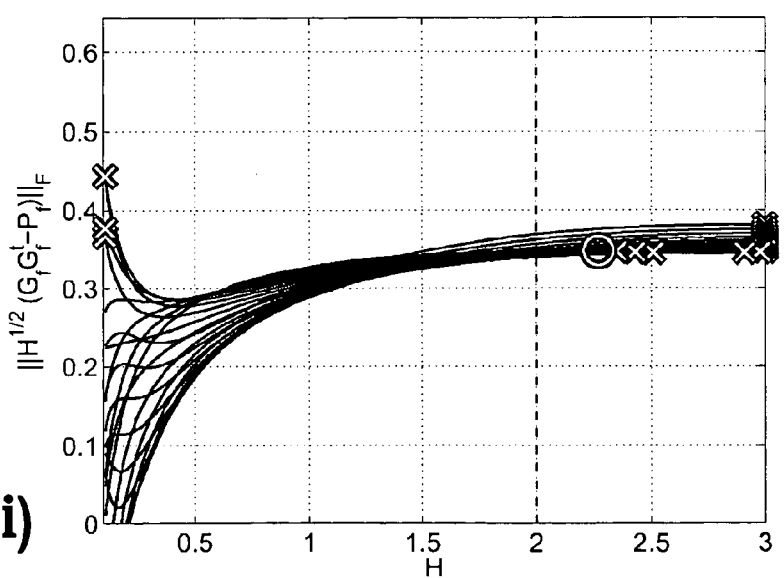
FIG. 7A(iii)

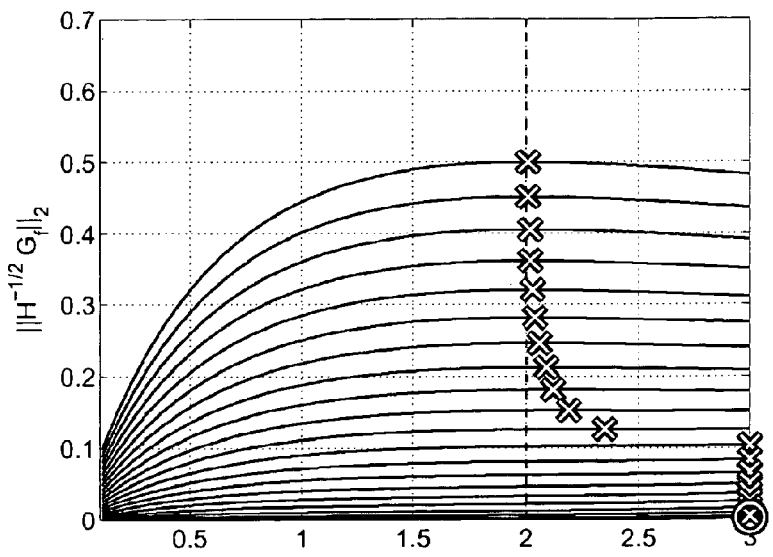
FIG. 7B(i)
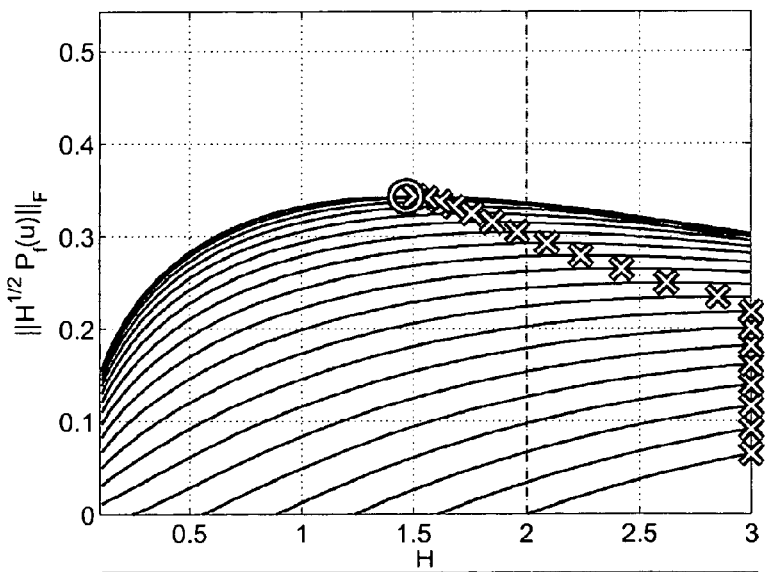
FIG. 7B(ii)
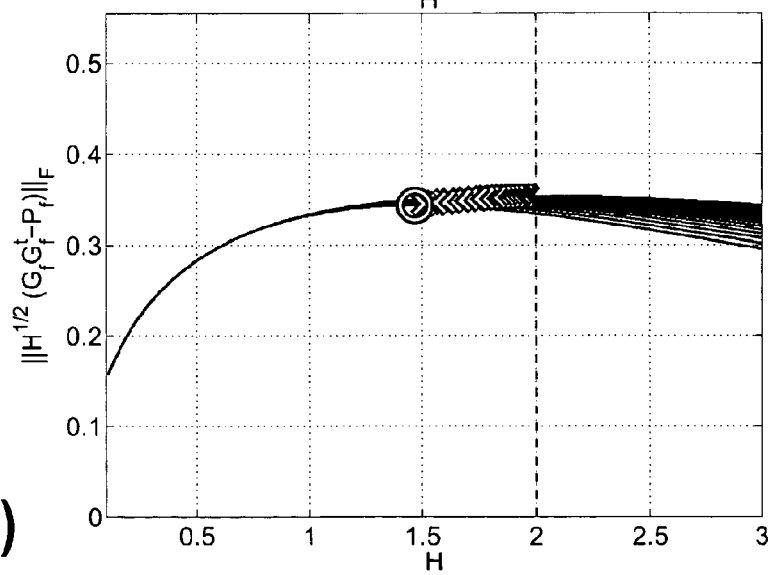
FIG. 7B(iii)

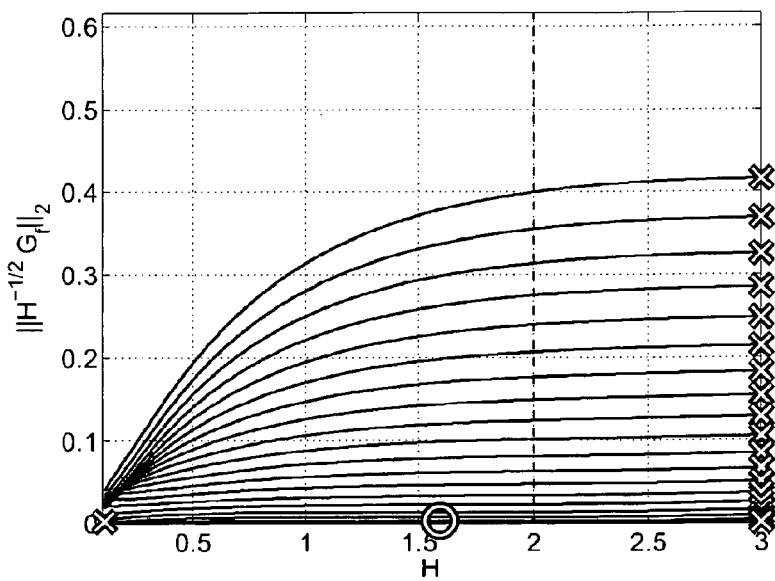
FIG. 7C(i)
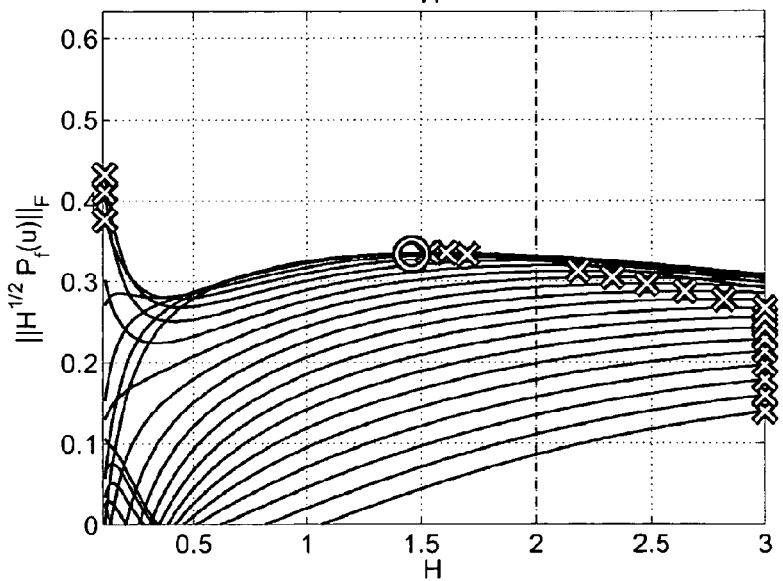
FIG. 7C(ii)
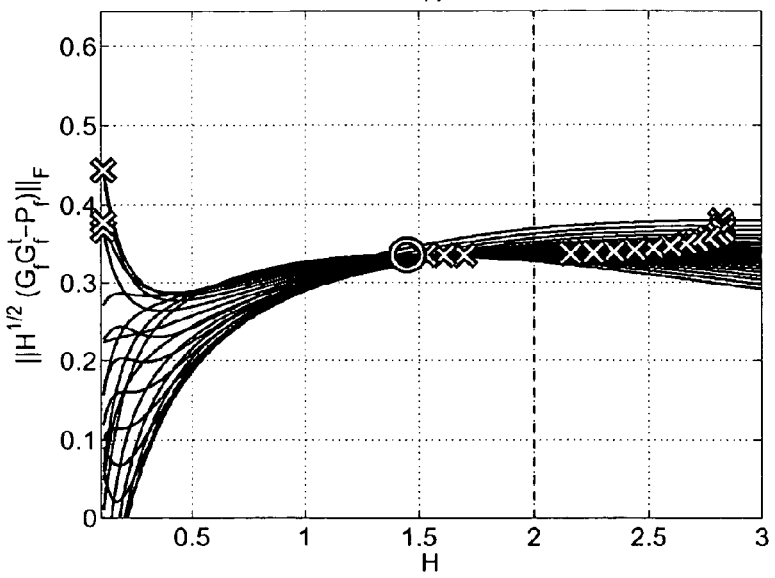
FIG. 7C(iii)

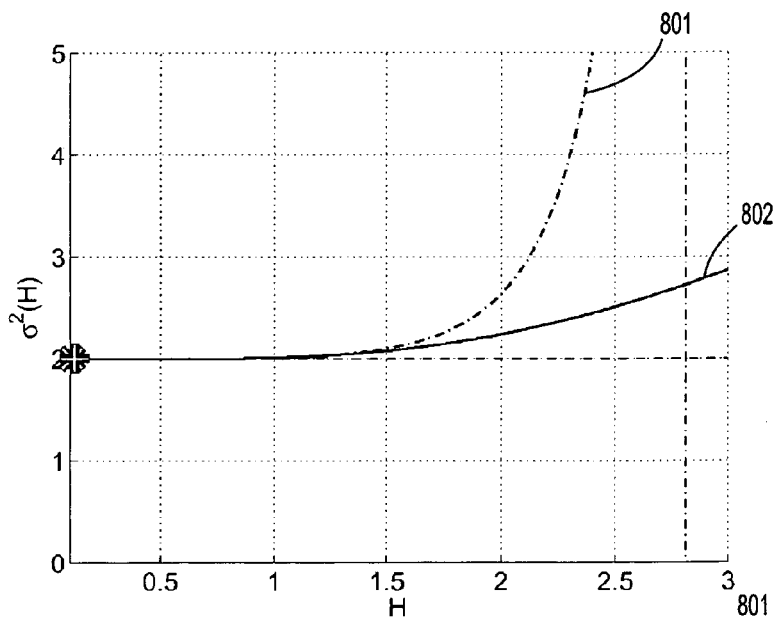
FIG. 8A(i)
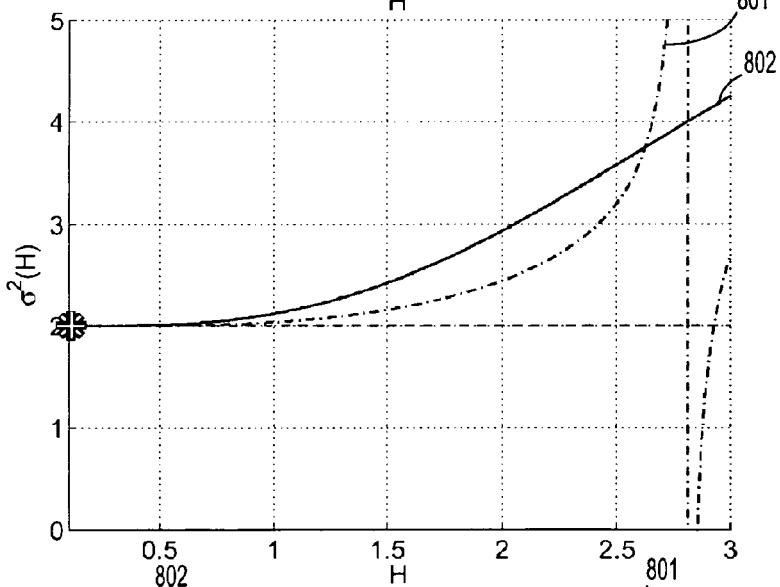
FIG. 8A(ii)
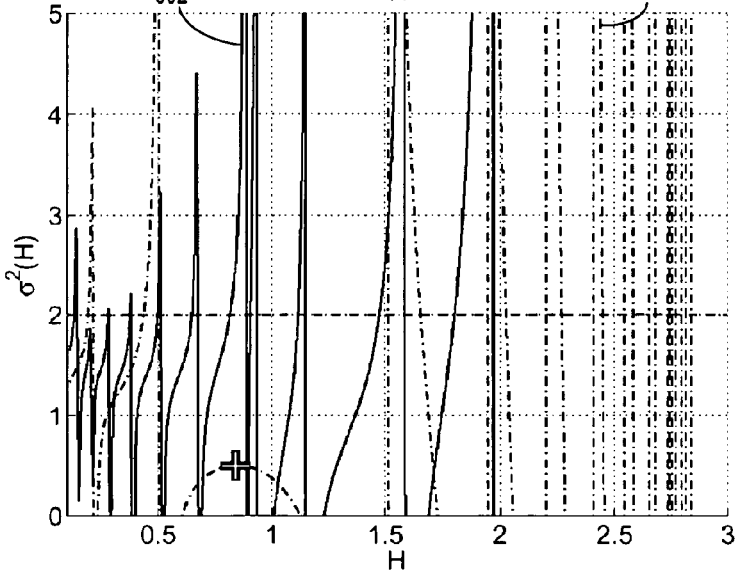
FIG. 8A(iii)

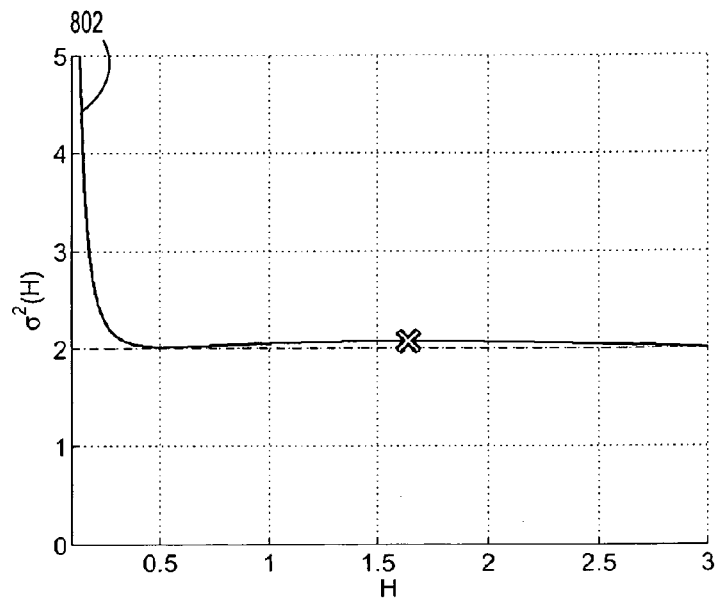
FIG. 8B(i)
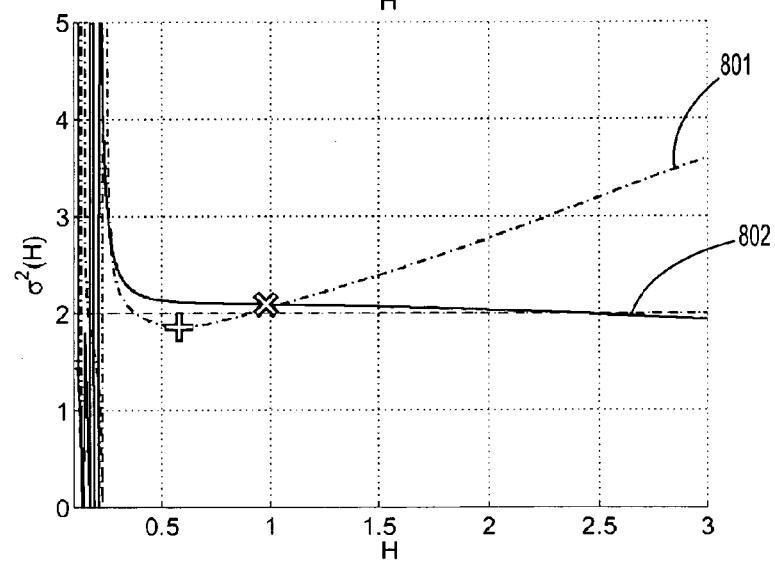
FIG. 8B(ii)
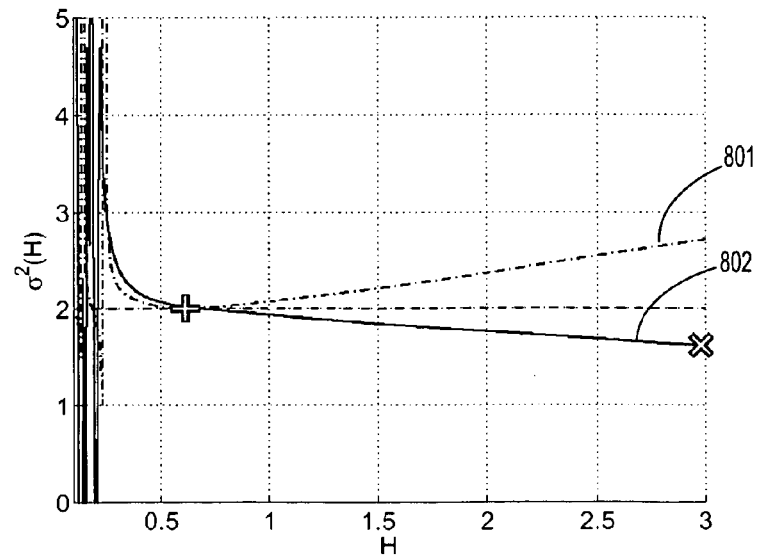
FIG. 8B(iii)

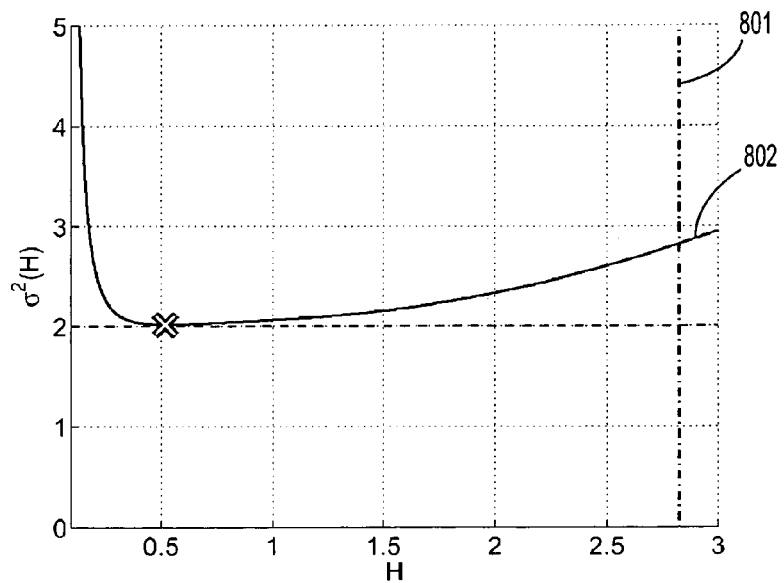
FIG. 8C(i)
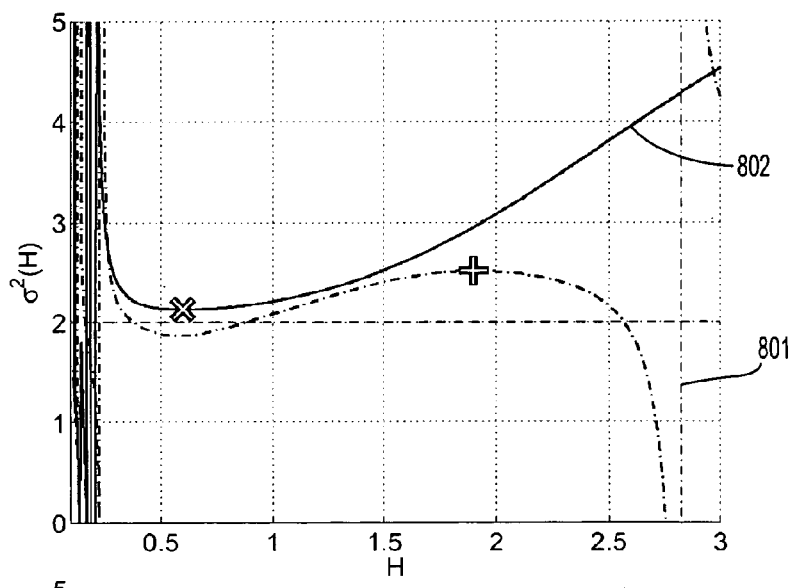
FIG. 8C(ii)
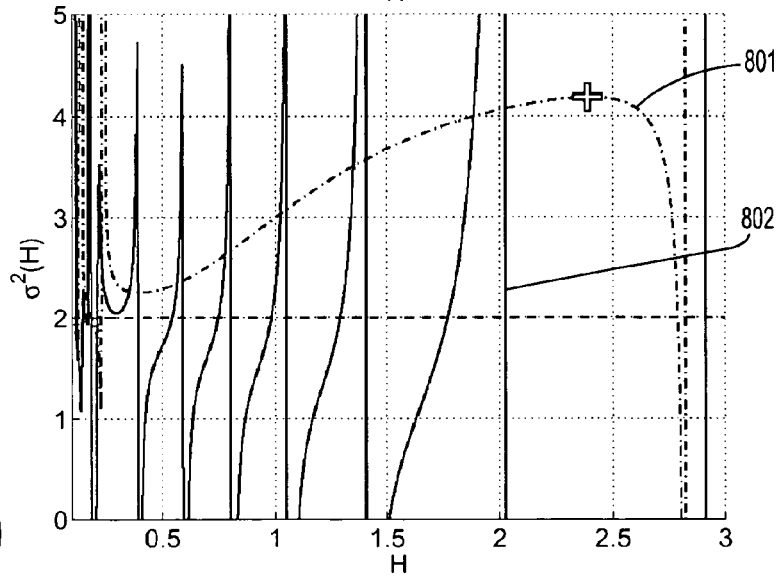
FIG. 8C(iii)

SCALE SELECTION FOR ANISOTROPIC SCALE-SPACE: APPLICATION TO VOLUMETRIC TUMOR CHARACTERIZATION

This application claims priority to U.S. Provisional Application Ser. No. 60/523,129, filed on Nov. 18, 2003, which is herein incorporated by reference in its entirety.

BACKGROUND OF THE INVENTION

1. Field of the Invention

The present invention relates to volumetric image data characterization, and more particularly to a system and method for treating a scale selection problem in the anisotropic scale-space.

2. Description of Related Art

Gaussian scale-space theory offers a general paradigm for analyzing various image features of arbitrary size. One of its useful attributes is the maximum-over-scales property of the γ-normalized derivatives. Under the maximum-over-scales approach, the characteristic scale of a feature at the spatial local maximum location corresponds to the bandwidth of the Gaussian kernel that provides the local maximum of the normalized derivatives over the varying bandwidths at the location. This is a proposed solution to the general scale selection problem: given a set of analysis scales (bandwidths), find the analysis scale that provides the best estimate of the local feature's scale or other properties. The theory has been studied extensively and applied to various problems. However, the main focuses have been on the scale-space functions that model either the isotropic homogeneous or anisotropic inhomogeneous diffusion processes.

Therefore, a need exists for a system and method for treating a scale selection problem in the anisotropic scale-space

SUMMARY OF THE INVENTION

According to an embodiment of the present disclosure, a method for determining a structure in volumetric data comprises determining an anisotropic scale-space for a local region around a given spatial local maximum, determining L-normalized scale-space derivatives in the anisotropic scale-space, and determining the presence of noise in the volumetric data and upon determining noise in the volumetric data, determining the structure by a most-stable-over-scales determination, and upon determining noise below a desirable level, determining the structure by one of the most-stable-over-scales determination and a maximum-over-scales determination.

The most-stable-over-scales determination comprises determining a plurality of covariance estimates over an analysis scale set, and determining a covariance estimate from among the plurality of covariance estimates having a minimum Jensen-Shannon divergence, wherein the covariance estimate defines a spread of the structure. The analysis scale set is a given set of bandwidths over the volumetric data.

The a maximum-over-scales determination comprises determining Gamma- and L-normalized scale-space derivatives over an analysis scale set, and selecting a scale having a maximum normalized scale-space derivative, wherein the scale is a covariance defining a spread of the structure. The Gamma- and L-normalized scale-space derivatives are determined with a constant normal having a Gamma- equal to ½. The analysis scale set is a given set of bandwidths over the volumetric data.

The spatial local maximum indicates a location of the structure in the volumetric data.

According to an embodiment of the present disclosure a method for determining a structure in volumetric data comprises providing an analysis scale set over the volumetric data, determining a plurality of covariance estimates over the analysis scale set, and determining a covariance estimate from among the plurality of covariance estimates having a maximum stability, wherein the covariance estimate defines a spread of the structure. The analysis scale set is a set of bandwidths over the volumetric data. The maximum stability is determined according to a minimum Jensen-Shannon divergence. Each covariance estimate corresponds to a measurement pair around a spatial local maximum, wherein a sampling range of the measurement pairs is measured by a signal variance.

According to an embodiment of the present disclosure, a program storage device is provided readable by machine, tangibly embodying a program of instructions executable by the machine to perform method steps for determining a structure in volumetric data. The method steps comprises determining an anisotropic scale-space for a local region around a given spatial local maximum, determining L-normalized scale-space derivatives in the anisotropic scale-space, and determining the presence of noise in the volumetric data and upon determining noise in the volumetric data, determining the structure by a most-stable-over-scales determination, and upon determining noise below a desirable level, determining the structure by one of the most-stable-over-scales determination and a maximum-over-scales determination.

BRIEF DESCRIPTION OF THE DRAWINGS

Preferred embodiments of the present invention will be described below in more detail, with reference to the accompanying drawings:

FIGS. 7A-C are graphs illustrating a variance estimation obtained using a maximum-over-scales for first order (i) and second order (ii) and (iii) methods according to an embodiment of the present disclosure;

FIGS. 8A-C are graphs illustrating a variance estimation obtained using a most-stable-over-scales method where the variance or the target is estimated from samples within ±0.1σ (i), ±1.0σ (ii), and ±2.0σ (iii) according to an embodiment of the present disclosure;

DETAILED DESCRIPTION OF PREFERRED EMBODIMENTS

According to an embodiment of the present disclosure, a scale selection problem in an anisotropic scale-space may be treated. The anisotropic scale-space is a generalization of the classical isotropic Gaussian scale-space by considering the Gaussian kernel with a fully parameterized analysis scale (bandwidth) matrix.

Figure 1:
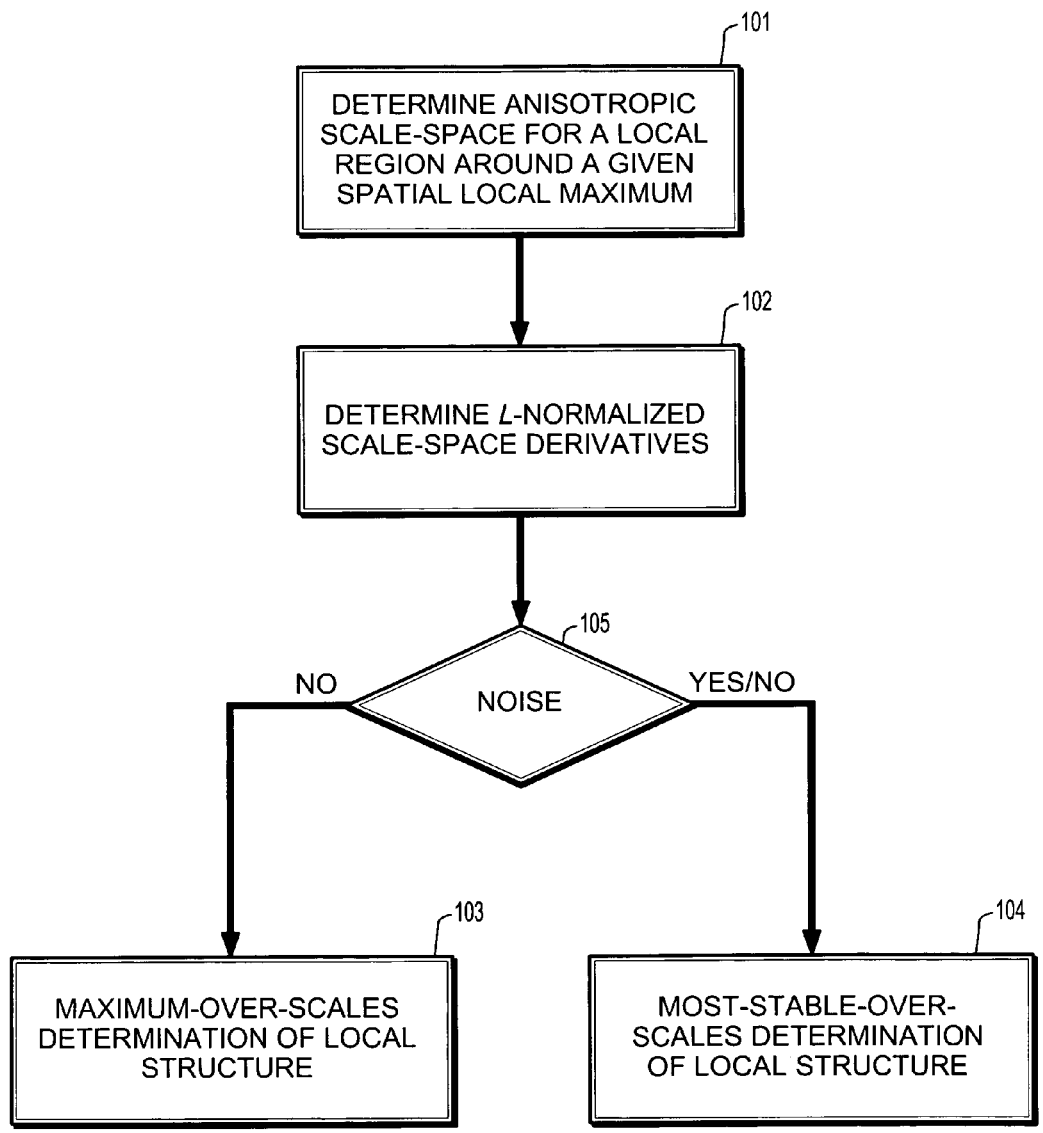
FIG. 1 is a flow chart illustrating a method according to an embodiment of the present disclosure.

Referring to FIG. 1, for an anisotropic scale-space is determined around a local region and a given spatial local maximum in image data 101. The spatial local maximum, e.g., a location of a tumor in the image data, may be, for example, provided manually by a radiologist. Alternatively, a mode seeking method based on a mean shift procedure may be employed to determine a spatial local maximum prior to the covariance estimation. The maximum-over-scales 103 and the most-stable-over-scales 104 criteria are constructed by employing the L-normalized scale-space derivatives 102. The L-normalized scale-space derivatives are response-normalized derivatives in the anisotropic scale-space. This extension allows for directly analyzing the anisotropic (ellipsoidal) shape of local structures. According to an embodiment of the present disclosure, the norm of the γ- and L-normalized anisotropic scale-space derivatives with a constant $\gamma=\frac{1}{2}$ are maximized regardless of the signal's dimension if the analysis scale matrix is equal to the signal's covariance. The most-stable-over-scales criterion with the isotropic scale-space outperforms the maximum-over-scales criterion in the presence of noise. At block 105, upon determining noise in the data, the most-stable-over-scales method may be selected. Where noise is not determined to be present, either maximum-over-scales methods or most-stable-over-scales methods may be implemented. The determination of whether noise is present in the data may be made for example, manually or determined according to a threshold local variance of the data. One of ordinary skill in the art would appreciate that various methods for determining noise in data may be used.

Experiments with 1D and 2D synthetic data have been preformed. 3D implementations of the most-stable-over-scales methods are applied to the problem of estimating anisotropic spreads of pulmonary tumors shown in high-resolution computed tomography (HRCT) images. First- and second-order methods have been demonstrated.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
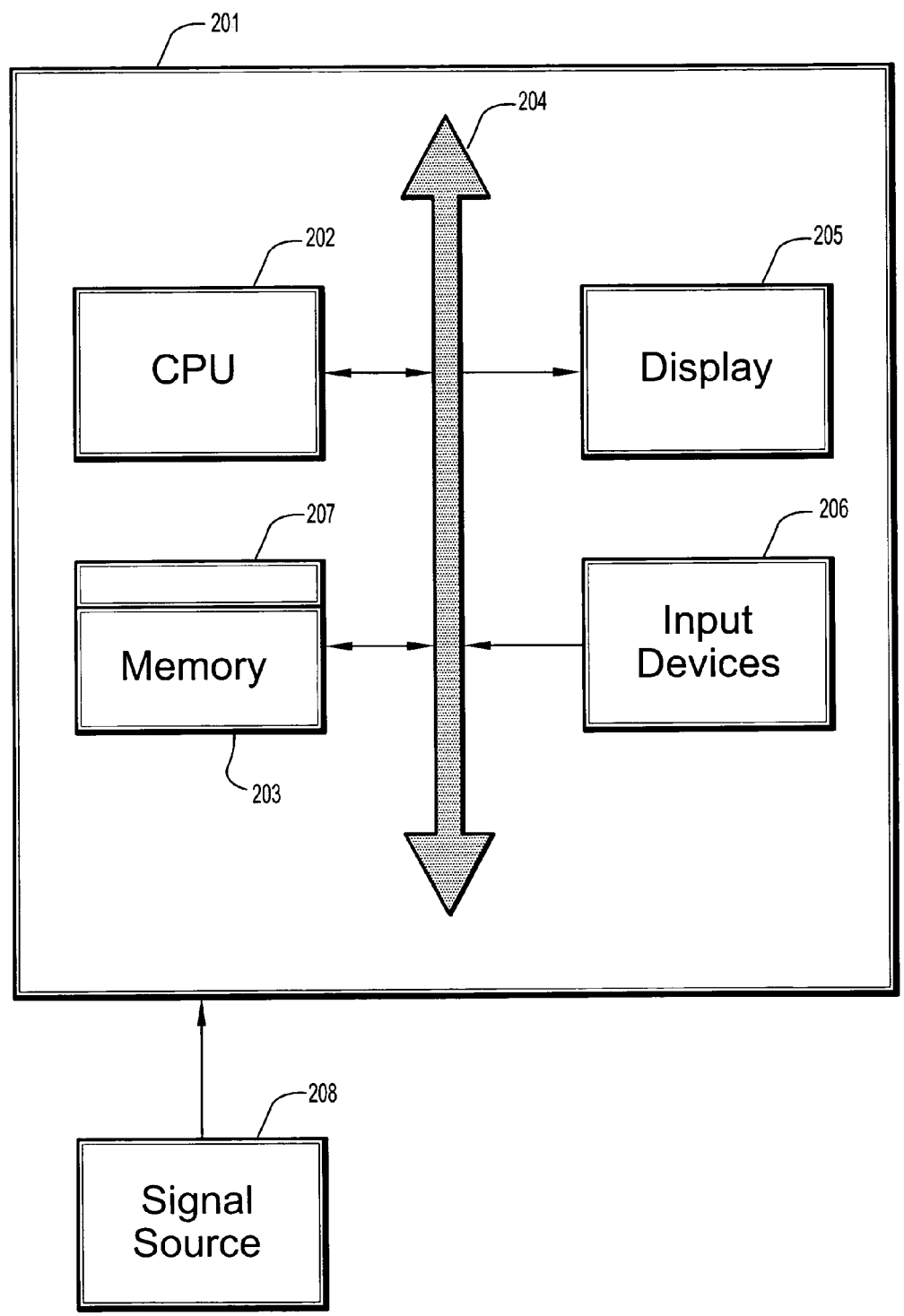
FIG. 2 is a diagram of a system according to an embodiment of the present disclosure.

Referring to FIG. 2, according to an embodiment of the present disclosure, a computer system 201 for determining a scale selection for an anisotropic scale-space can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208, such as a CT scanner. As such, the computer system 201 is a general-purpose computer system that becomes a specific purpose computer system when executing the routine 207 of the present invention.

The computer platform 201 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present disclosure, anisotropic scale-space as a solution to the anisotropic homogeneous diffusion equation. The anisotropic scale-space is characterized by a fully parameterized analysis scale matrix and is a generalization of the classical isotropic Gaussian scale-space. This extension allows for the directly analysis of the anisotropic (ellipsoidal) shape of the local structures. The scale-space analysis can be interpreted as the covariance estimation of signals locally modeled by a Gaussian-based function.

Scale selection frameworks according to an embodiment of the present disclosure may be divided into maximum-over-scales 103 and most-stable-over-scales 104 criteria, constructed from L-normalized scale-space derivatives 102, which are response-normalized derivatives in the anisotropic scale-space. For practical consideration, the isotropic scale-space is employed for constructing the most-stable-over-scales 104 criterion. By considering local Gaussian-like (blob-like) structures, a number of scale selection solutions are derived from the first- and second-order normalized derivatives. In applications, the second-order blob feature may provide information about target structures such as tumors in medical imaging or faces in surveillance applications.

The norm of the γ- and L-normalized anisotropic scale-space derivatives with a constant $\gamma=\frac{1}{2}$ exhibit the maximum-over-scales property regardless of the signal's dimension for both the use of the first- and second-order derivatives. Further, the most-stable-over-scales criterion with the isotropic scale-space outperforms the maximum-over-scales criterion in the presence of noise. Experiments with 1D and 2D synthetic data are conducted to validate these findings. 3D implementations of the proposed methods have been applied to the problem of estimating anisotropic spreads of pulmonary tumors shown in high-resolution computed-tomography (HRCT) images. Comparison of the first- and second-order methods indicates the advantage of exploiting the second-order information.

Referring to the anisotropic scale-space, given a d-variate continuous positive signal $f(x)$, the local region of $f$ forming a Gaussian like structure around a spatial local maximum u can be approximated by a product of a d-variate Gaussian function and a positive multiplicative parameter, $$f(x) \approx \alpha \times \Phi(x; u, \Sigma) | x \in s \quad (1)$$

where S is a set of data points in the neighborhood of u, belonging to the basin of attraction of u, and $\Phi(x;u,\Sigma)=$ $(2\pi)^{-d/2}|\Sigma|^{-1/2}\exp(-\frac{1}{2}(x-u)^t\Sigma^{-1}(x-u))$. The co-variance $\Sigma$ of $\Phi$ describes the spread of the local Gaussian like structure. Its anisotropy can be specified only by a fully parameterized covariance.

The Gaussian scale-space is a one-parameter family of a d-variate continuous signal $f$ provided by a convolution with isotropic Gaussian kernels $\Phi(x;0,H=hI)$ with varying analysis scales (bandwidths) $h \geq 0$.

$$L(x; H) = f(x) * \Phi(x; 0, H) \quad (2)$$

Such a linear scale-space is known to be a solution of the isotropic diffusion equation $\partial_h L = \frac{1}{2}\nabla^2 L$.

The anisotropic scale-space may be defined as a generalization of Eq. (2) by considering a fully parameterized symmetric positive definite analysis scale matrix $H \in SPD \in \Re^{d \times d}$, where SPD denotes the set of symmetric positive definite matrices. The anisotropic scale-space 101 is a solution to the anisotropic homogeneous diffusion $\partial_H L = \frac{1}{2}\nabla\nabla^t L$. It should not be confused with the well-known anisotropic diffusion, which models inhomogeneous diffusion processes.

The nth-order derivatives of $L(x;H)$ can be derived by convolving the signal $f(x)$ with the nth-order Gaussian derivative kernels since the differential operators commute across the convolution operations. Thus, scale-space gradient vector $G(x;H) \in \Re^d$ and scale-space Hessian matrix $P(x;H) \in \Re^{d \times d}$ are defined by, $$G(x; H) \equiv \nabla L(x; H) \quad (3)$$
$$= f(x) * \Phi(x; H)H^{-1}(-x)$$

$$P(x; H) \equiv \nabla\nabla^t L(x; H) \quad (4)$$
$$= f(x) * \Phi(x; H)H^{-1}(xx^t - H)H^{-1}$$

By substituting Eq. (1) to Eq. (2), Eq. (3), and Eq. (4), analytical formula of the scale-space L and its derivatives G and P are derived as functions of a Gaussian with a covariance matrix $\Sigma+H$, $$L(x; H) = \alpha\Phi(x; u, \Sigma+H) \quad (5)$$

$$G(x; H) = \alpha\Phi(x; u, \Sigma+H)(\Sigma+H)^{-1}(u-x) \quad (6)$$

$$P(x; H) = \quad (7)$$
$$\alpha\Phi(x; u, \Sigma+H)(\Sigma+H)^{-1}[(u-x)(u-x)^t - (\Sigma+H)](\Sigma+H)^{-1}$$

L-normalized derivatives 102 defined by the point-wise division of the scale-space derivatives are introduced by the corresponding scale-space. L-normalized scale-space gradient vector $G_l$ and Hessian matrix $P_l$ are defined by, $$G_l(x; H) \equiv \frac{G(x; H)}{L(x; H)} = (\Sigma+H)^{-1}(u-x) \quad (8)$$

$$P_l(x; H) \equiv \frac{P(x; H)}{L(x; H)} \quad (9)$$
$$= (\Sigma+H)^{-1}(u-x)(u-x)^t(\Sigma+H)^{-1} - (\Sigma+H)^{-1}$$

They are response-normalized derivatives in the scale-space and vanish both the multiplicative parameter and the exponential term from the derivative formulae. Both L-normalized scale-space gradient and Hessian may be determined since $L(x;H)$ is non-zero within a finite range with positive $f(x)$.

Given a Gaussian scale-space, some scale-space derivative functions normalized by the analysis scale raised to the power of a real upper-bounded value $\gamma$ assume their local maximum at the characteristic scale of the target feature. For the d-variate local Gaussian-like structures, the $\gamma$-normalized Laplacian with $\gamma=(d+2)/4$ evaluated at a spatial local maximum, $tr(H^{(d+2)/4}P(u;H))$, is locally maximized over scales when the analysis scale h is equal to the signal's variance $\sigma^2$, where "tr" denotes the trace of a d×d matrix, $H=hI$, and $\Sigma=\sigma^2 I$. This maximum-over-scales property holds for the anisotropic scale-space with fully parameterized H and $\Sigma$.

Figure 3A:
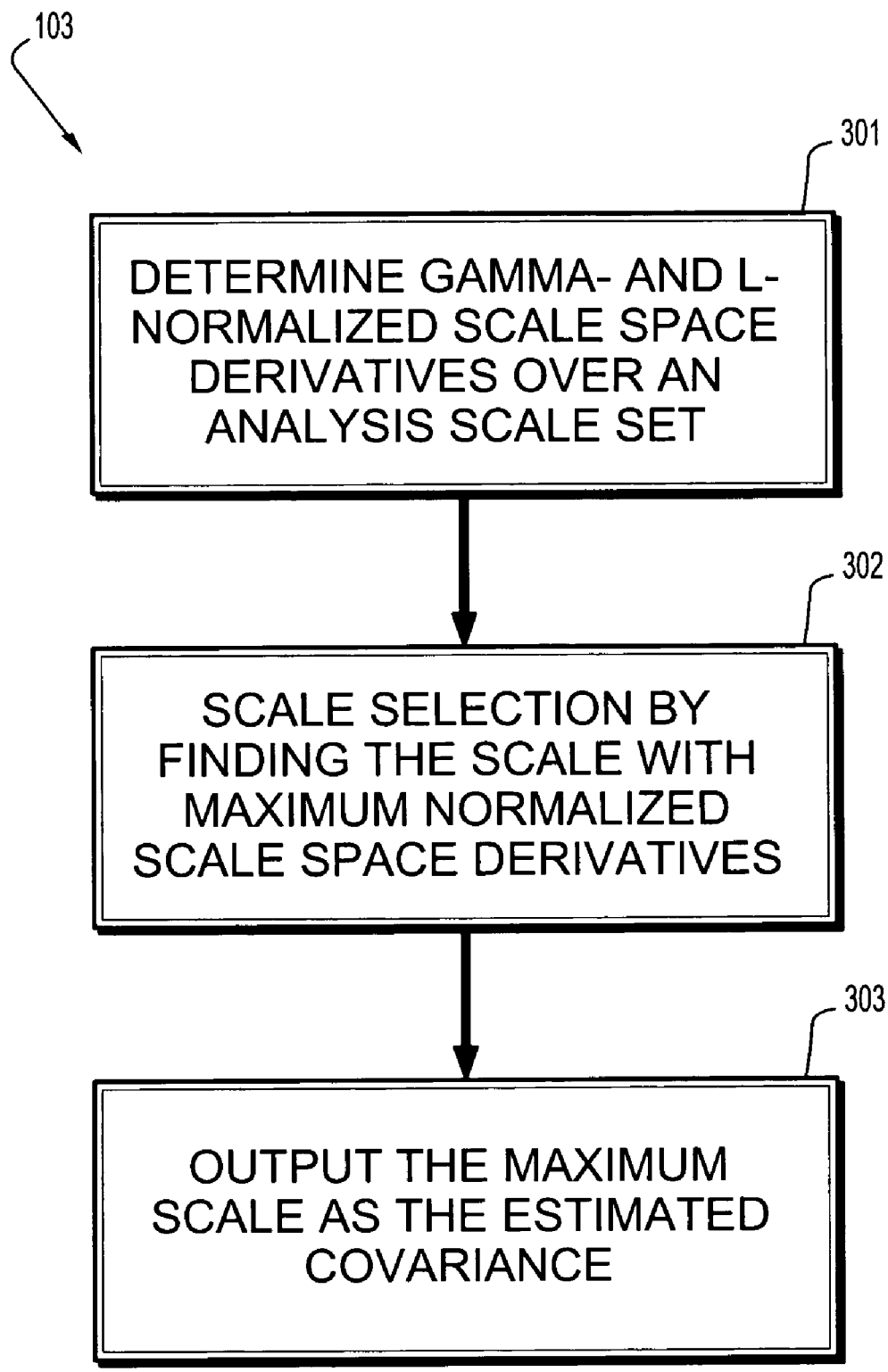
FIGS. 3A-B is a flow chart illustrating a method according to an embodiment of the present disclosure.

Referring to FIG. 3A, a maximum-over-scales criterion is constructed with the norm of the $\gamma$-normalization of the L-normalized scale-space derivatives 301. According to an embodiment of the present disclosure, a constant $\gamma=\frac{1}{2}$ gives rise to the maximum-over-scales property regardless of the signal's dimensions for both the first- and second-order cases 302. The spatial local maximum location u is assumed to be known hereafter. For notational simplicity, the function arguments of $G_l(x;H)$ and $P_l(x;H)$ are omitted unless they are evaluated at a specific location.

For the first-order determination, using Eq. (8), a $\gamma$-normalization of the L-normalized scale-space gradient vector with $\gamma=\frac{1}{2}$ is expressed by $H^{1/2}G_l=H^{1/2}(\Sigma+H)-1(u-x)$. The $L_2$ norm of the normalized gradient is considered, $$\|H^{1/2}G_l\|_2 = \|H^{1/2}(\Sigma+H)^{-1}(u-x)\|_2 \quad (10)$$

Figure 4A:
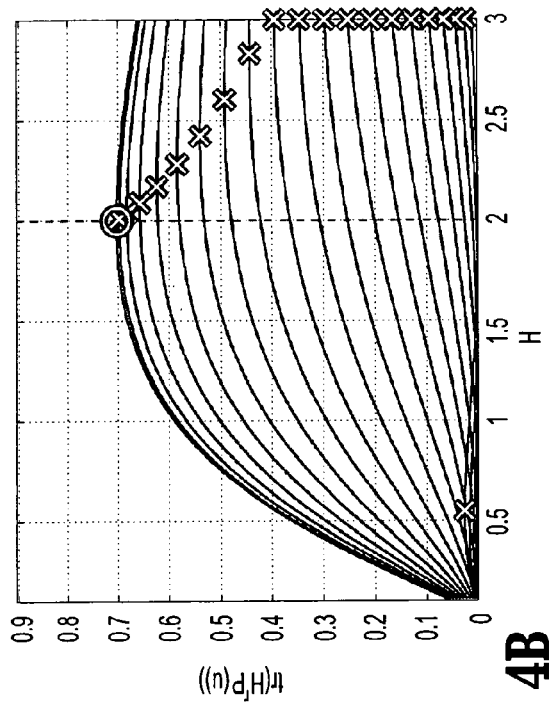
FIGS. 4A-D are graphs of results obtains using a maximum-over-scales method according to an embodiment of the present disclosure.

Rewriting this equation with the mean shift vector $m(x;H)$ results in $\|H^{1/2}G_l\|_2 = \|H^{-1/2}m\|_2$. This demonstrates that the $L_2$ norm is equivalent with the magnitude of the bandwidth-normalized mean shift vector. The theorem states that such magnitude exhibits the maximum-over-scales property with $H=\Sigma$. Thus, the $L_2$ norm of the $\gamma$- and L-normalized scale-space gradient vector possesses the maximum-over-scales property. This criterion holds at arbitrary locations $x \in S$ except at u as shown in FIG. 4A.

Referring now to the second-order determinations, two types of second-order scale selection methods are considered. First, a solution only with the Hessian matrix is examined. Using Eq. (9), the $\gamma$-normalization of the L-normalized scale-space Hessian matrix with $\gamma=\frac{1}{2}$ is expressed by $H^{1/2}P_l=H^{1/2}G_lG_l^t - H^{1/2}(\Sigma+H)^{-1}$. When evaluated at the spatial maximum u, the normalized Hessian is reduced to the following form since $G_l$ becomes zero: $H^{1/2}P_l(u;H)=-H^{1/2}(\Sigma+H)^{-1}$. The Frobenius matrix norm of this derivative matrix function is given by, $$\|H^{1/2}P_l(u; H)\|_F = \|H^{1/2}(\Sigma+H)^{-1}\|_F \quad (11)$$

The following maximum-over-scales method is obtained using Eq. (11),

Proposition 1

The Frobenius norm of the $\gamma$- and L-normalized scale-space Hessian matrix with $\gamma=\frac{1}{2}$ is maximized when the fully parameterized analysis scale matrix $H \in SPD$ is equal to $\Sigma$.

Proof

Defining $\eta(H) \equiv \|H^{1/2}P_l(u;H)\|_F$; the proposition must be true if $\eta(\Sigma)^2 - \eta(H)^2$ is greater or equal to zero with equality if $H=\Sigma$. Recall that $\Sigma$ and H are symmetric positive definite matrices. Thus, $$\eta(\Sigma)^2 - \eta(H)^2 = \|\Sigma^{1/2}(\Sigma+\Sigma)^{-1}\|_F^2 - \|H^{1/2}(\Sigma+H)^{-1}\|_F^2 \quad (21)$$
$$= \frac{1}{4}tr(\Sigma^{-1/2}\Sigma^{-1/2}) - tr((\Sigma+H)^{-1}H(\Sigma+H)^{-1})$$

-continued $$= \frac{1}{4} tr(\Sigma^{-1} - 4(\Sigma + H)^{-1} H(\Sigma + H)^{-1})$$

$$= \frac{1}{4} tr((\Sigma + H)^{-1}(H\Sigma^{-1} - I)^2 \Sigma(\Sigma + H)^{-1})$$

Since $\Sigma$ and H are positive definite, all the matrices inside the trace in Eq. (21) are also positive definite. Since the trace of a positive definite matrix is positive valued, $\eta(\Sigma)^2 - \eta(H)^2 \geq 0$. The equality holds if $H=\Sigma$.

Figure 3B:
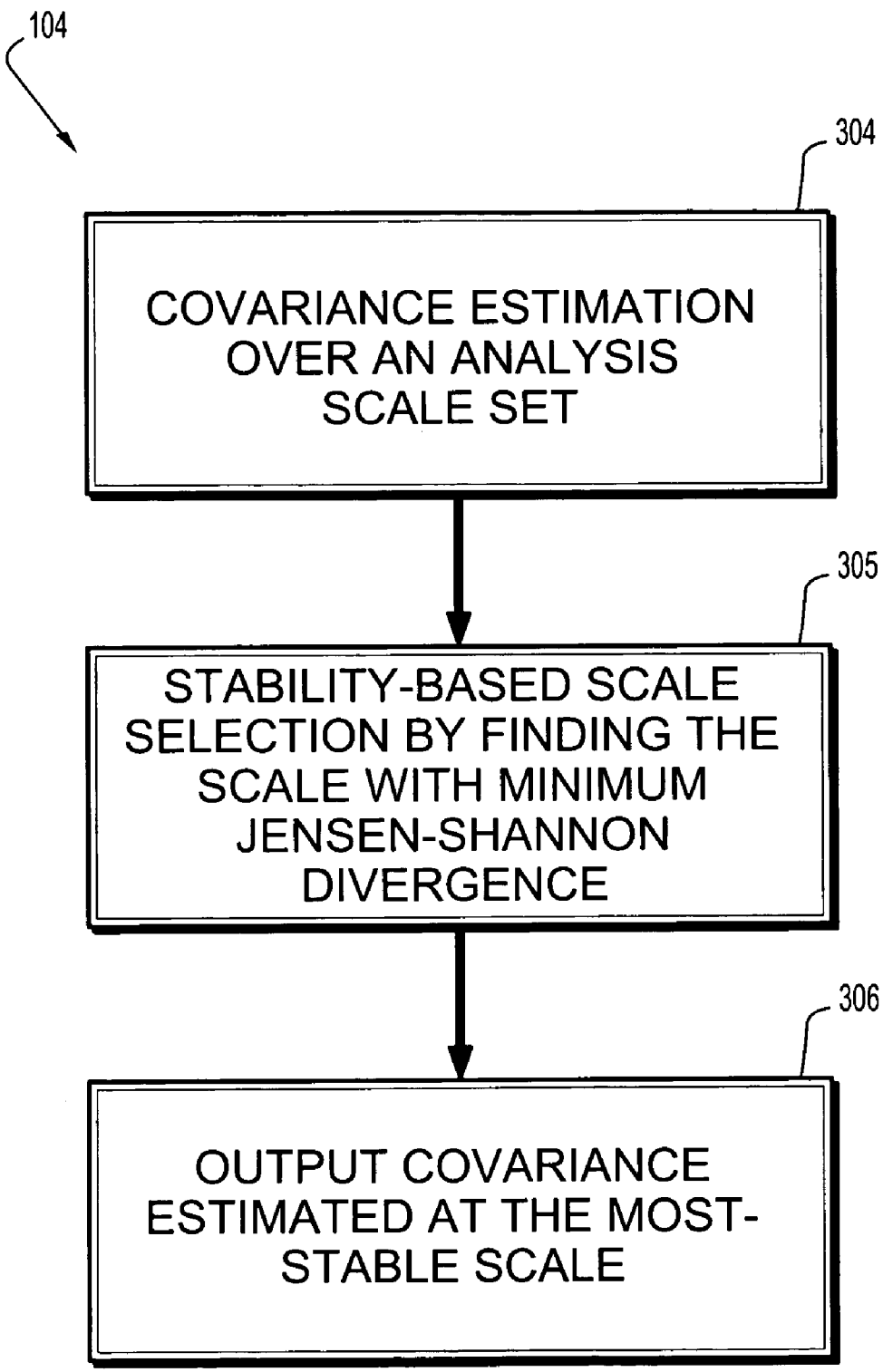
Figure 4B:
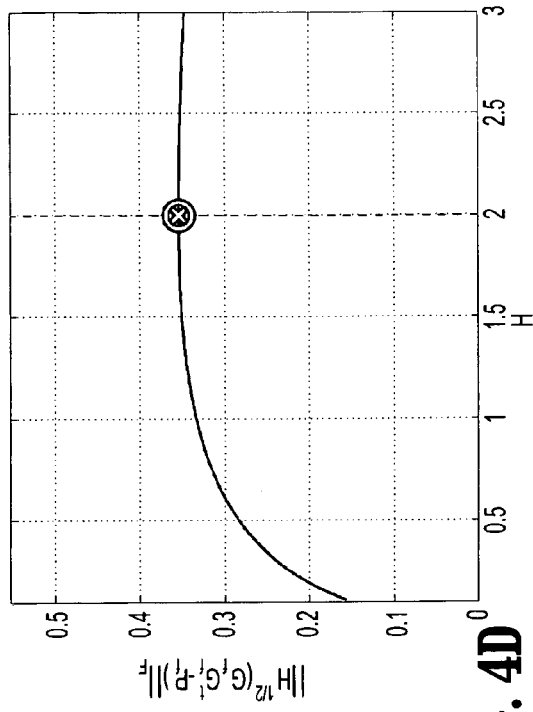
Figure 4C:
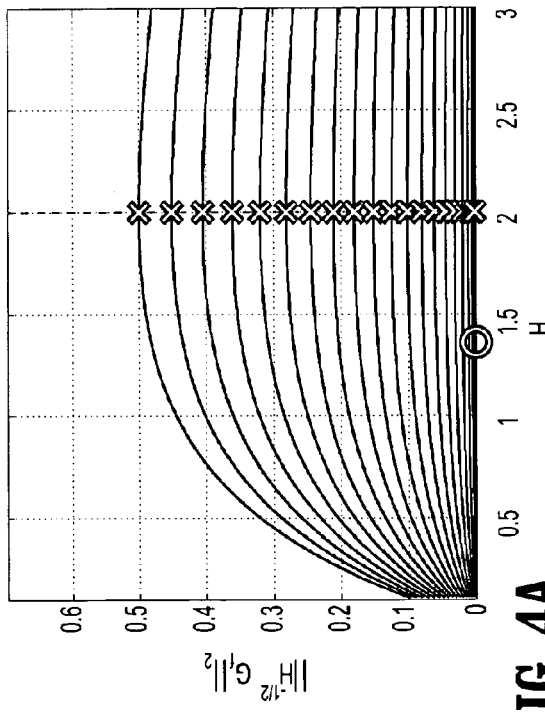

Proposition 1 is true at the spatial maximum u as shown in FIG. 4C. The d-variate γ-normalized Laplacian can be expressed as a matrix trace:
$tr(H^{(d+2)/4} P(u;H)) = -L(u;H) tr(H^{(d+2)/4}(\Sigma+H)^{-1})$. Also the Frobenius norm in Eq. (11) can be expressed by $\|H^{1/2} P_l(u;H)\|_F^2 = tr((\Sigma+H)^{-1} H(\Sigma+H)^{-1})$. As compared in FIG. 3B and FIG. 4C, both methods behave similarly despite the difference in their functional forms.

Second, a solution that includes both gradient and Hessian is examined. From Eq. (9), the γ- and L-normalization of a derivative function $G_l G_l^t - P_l$ with $\gamma = \frac{1}{2}$ is given by $H^{1/2}(G_l G_l^t - P_l) = H^{1/2}(\Sigma+H)^{-1}$. And its Frobenius norm is, $$\|H^{1/2}(G_l G_l^t - P_l)\|_F = \|H^{1/2}(\Sigma+H)^{-1}\|_F \quad (12)$$

Consequently, the following maximum-over-scales method is obtained,

Proposition 2

Consider a scale-space derivative matrix function of a sum of the outer-product of the L-normalized scale-space gradient vector and the negated L-normalized scale-space Hessian matrix. The Frobenius norm of the γ-normalization of this matrix function with $\gamma = \frac{1}{2}$ is maximized when the fully parameterized analysis scale matrix $H \in SPD$ is equal to $\Sigma$ 303.

Proof:

For all $x \in S$, $\|H^{1/2}(G_l G_l^t - P_l)\|_F = \|H^{1/2}(\Sigma+H)^{-1}\|_F = \eta(H)$. From the proof of Proposition 1, $\eta(\Sigma)^2 - \eta(H)^2 \geq 0$ with equality $H=\Sigma$.

Figure 4D:
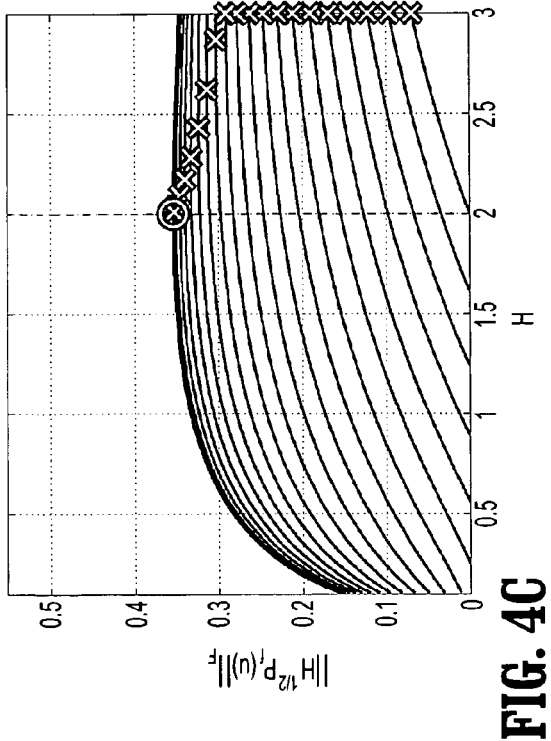

As shown in FIG. 4D, this determination is invariant against the locations and its maximum-over-scales property holds for all the locations $x \in S$.

FIGS. 4A-D illustrates examples of the maximum-over-scales methods. A centered 1D Gaussian signal with $\sigma^2 = 2$ is used as target. FIG. 4A illustrates the first-order method with Eq. (10), FIG. 4B illustrates the γ-normalized Laplacian, FIG. 4C illustrates the second-order method with Eq. (11), FIG. 4D illustrates the second-order method with Eq. (12). Each plot displays the norm evaluated at locations $x = 0, 0.1, \ldots, 2$ over the analysis scales $h = 0.1, 0.11, \ldots, 3$. Dash lines denote the ground-truth scale. "O" and "×" indicate the maximum-over-scales for the spatial maximum ($x=0$) and for the non-maximum ($x \neq 0$), respectively.

According to an embodiment of the present disclosure, the most-stable-over-scales criterion has been constructed by employing the L-normalized scale-space derivatives. This approach exploits the fact that the scale selection with the anisotropic scale-space can be seen as fully parameterized covariance estimation. Each derived method includes 1) a least-squares estimation of the signal's covariance $\Sigma(h)$ for each isotropic analysis scale h and 2) a divergence-based stability test for obtaining the most stable estimate over the scales $\hat{\Sigma} = \Sigma(h^* = \mathrm{argmin} \, \mathrm{div}\{\Sigma(h)\})$.

The maximum-over-scales criterion becomes impractical when high-dimensional anisotropic structures are considered. In such cases, a dense sampling of a multivariate product space is needed, resulting in prohibitively large search space. For this practical reason, this criterion employs isotropic analysis scales $H = hI (h \in \mathfrak{R}^d > 0)$. This is possible because the direct covariance estimators are valid with arbitrary scale matrices H (see below). Furthermore, estimation errors due to noise can be reduced by combining a set of estimates derived from different locations within the basin of attraction of u since the direct estimators are also satisfied at arbitrary locations $x \in S$.

For the stability test, the Jensen-Shannon divergence is employed given a set of ordered analysis scales $\{h_s | s = 1, \ldots, S\}$, $$JS(s) = \frac{1}{2} \log \frac{\left| \frac{1}{2a+1} \sum_{s-a}^{s+a} \Sigma(h_i) \right|}{\sqrt[2a+1]{\prod_{s-a}^{s+a} |\Sigma(h_i)|}} + \frac{1}{2} \sum_{s-a}^{s+a} (u(h_i) - u)^t \left( \sum_{s-a}^{s+a} \Sigma(h_i) \right)^{-1} (u(h_i) - u) \quad (13)$$

where $$u = \frac{1}{2a+1} \sum_{s-a}^{s+a} u(h_i)$$

and α is a neighborhood parameter.

Explicit estimators of the signal's covariance $\Sigma$ used for constructing the stability-based scale selection criterion are derived for the direct covariance estimators. The L-normalized scale-space derivatives can be numerically determined from the given signal $f(x)$ by using Eq. (2), Eq. (3), and Eq. (4). The resulting equations are satisfied with any given anisotropic analysis scale matrices $H \in SPD$.

A covariance estimator with the normalized gradient $G_l$ is derived by manipulating Eq. (8) while maintaining its equality, $$\Sigma G_l = u - x - H G_l \quad (14)$$

The resulting equation of an unknown $\Sigma$ is under-complete, requiring at least two independent samples for the unique determination. Given a sufficient number of independent samples, an over-complete normal equation can be formed and solved by a constrained least-squares method. This equation can also be expressed as a function of the fixed bandwidth mean shift vector $m(x;H) = H G_l(x;H)$, i.e., $\Sigma H^{-1} m = u - x - m$. This assumes exactly the same form as the constrained least-squares formulation. Both equations become singular when $G_l$ goes to zero at $x = u$.

Another covariance estimator with the normalized Hessian $P_l$ is derived by manipulating Eq. (9) while maintaining its equality, $$\Sigma = (G_l G_l^t - P_l)^- - H \quad (15)$$

This equation exploits both first- and second-order derivatives. Unlike the first-order equation, the equality holds at arbitrary locations $x \in S$.

At the spatial maximum u, Eq. (15) collapses into the form only with the Hessian matrix, $$\Sigma = (-P_l(u; H))^{-1} - H \qquad (16)$$

$$= L(u; H)(-P(u; H))^{-1} - H$$

The resulting form is similar to the well-known Hessian based covariance estimator, except the second negative term included due to its scale-space nature. Note that, for the second-order case, the magnitude parameter α can be expressed analytically. The analytical form of the scale-space Hessian matrix evaluated at the spatial maximum u is given by: $P(u;H) = -\alpha(2\pi)^{-d/2}|\Sigma+H|^{-1/2}(\Sigma+H)^{-1}$. This equation can be solved for Σ since H+Σ ∈ SPD, i.e., $\Sigma = \alpha^{2/d+2}|2\pi(-P(u;H))^{-1}|^{-1/d+2}(-P(u;H))^{-1} - H$ Since this and Eq. (16) are equivalent, the following formula may be obtained, $$\alpha = \sqrt{|2\pi(-P(u;H))^{-1}|L(u;H)^{d+2}} \qquad (17)$$

The scale-space Hessian P(x;H) is symmetric negative definite if x is at a stable critical point of −L(x;H). When P(u;H) is numerically determined by using Eq. (4), it needs to be assured that u satisfies this condition so that the estimated Σ by Eq. (16) satisfies the positive definite constraint and Eq. (17) remains as real-valued.

The first-order most-stable-over-scales method exploiting the direct covariance estimator of Eq. (14) 304 uses a similar method as a mean shift-based method:

Given the spatial maximum locations u(h) in L(x;hI), a set of K measurement pairs {(xk,Gl(xk;hI))|k=1, . . . , K} are sampled within the basin of attraction of u. These samples are used to construct an over-complete normal equation AΣ=B where $A \equiv (G_{f_1}, \ldots G_{f_K})^t$ and $B \equiv (u - x_1 - hG_{f_1}, \ldots u - x_K - hG_{f_K})^t$. The constrained least-squares determination of the normal equation for the unknown Σ ∈ SPD is given by finding the minimizer Y* of an area criterion $\|AY - BY^{-t}\|_F^2$ where Y is Cholesky factorization of Σ=YY$^t$. The closed-form of this determination is expressed by a function of symmetric Schur decompositions of $$P \equiv A^t A \text{ given } \tilde{Q} \equiv \Sigma_P U_P^t Q U_P \Sigma_P, \qquad (18)$$

$$\Sigma = U_P \Sigma_P^{-1} U_{\tilde{Q}} \Sigma_{\tilde{Q}} U_{\tilde{Q}}^t \Sigma_P^{-1} U_P^t$$

$$P = U_P \Sigma_P^2 U_P^t$$

$$\tilde{Q} = U_{\tilde{Q}} \Sigma_{\tilde{Q}}^2 U_{\tilde{Q}}^t$$

Applying these equations to a given set of analysis scales results in a set of estimates {(u(h), Σ(h))}. The most stable estimate is found by the stability test with the Jensen-Shannon (JS) divergence in Eq. (13) 305.

The second-order most-stable-over-scales method exploits the direct estimator of Eq. (15) or Eq. (16). Similar to the first-order method, a set of K measurement pairs {(G$_l$(x$_k$;hI), P$_l$(x$_k$;hI)} are sampled within the neighborhood of u. A least-squares covariance estimator is given by averaging the local estimates, $$\Sigma = \frac{1}{K} \sum_{k=1}^{K} \{(G_l(x_k; hI) G_l(x_k; hI)^t - P_l(x_k; hI))^{-1} - hI\} \qquad (19)$$

The second-order equation provides a full covariance estimate for each sample location. Thus a valid estimator with a single sample at the spatial local maximum location u can be obtained by using Eq. (16) 306. The stability-based scale selection is achieved by the same manner as the first-order method, $$\hat{u} = u(h^*) \qquad (20)$$

$$\hat{\Sigma} = \Sigma(h^*)$$

$$h^* = \arg\min JS(u(h), \Sigma(h))$$

Figure 5A:
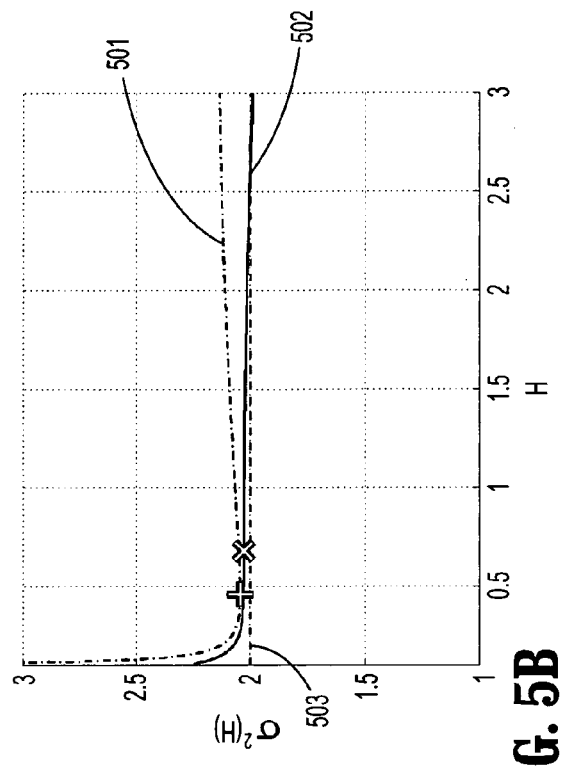
FIGS. 5A-C are graphs of results obtains using a most-stable-over-scales method according to an embodiment of the present disclosure.
Figure 5B:
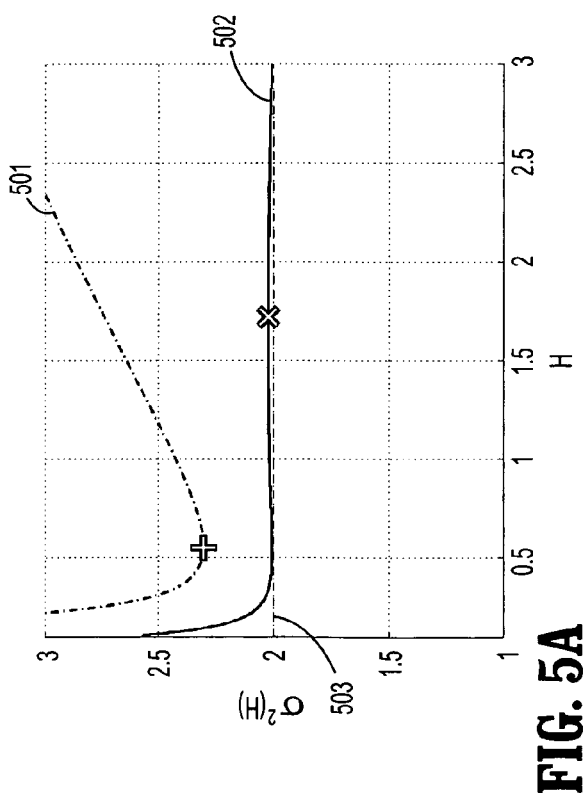
Figure 5C:
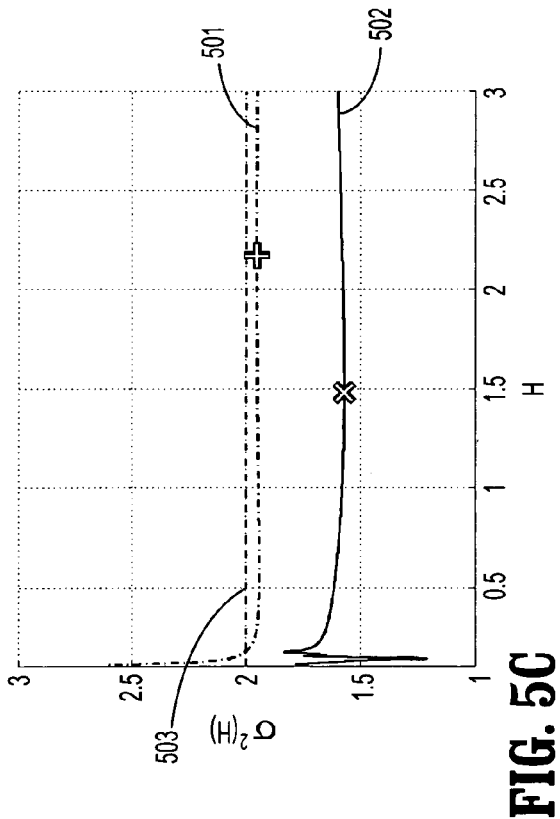

FIGS. 5A-C illustrates examples of the most-stable-over-scales methods and compares the first- and second-order most-stable-over-scales methods with the 1D synthetic Gaussian data with additive random noise. Three different sampling ranges were evaluated. Both methods achieve accurate scale estimation given an appropriate choice of the sampling range. The results also suggest that the first-order method favors a larger sampling range while the second-order method prefers a smaller one. When using the data without the noise, both methods resulted in estimates with no errors.

In FIGS. 5A-C, a centered 1D Gaussian signal of σ$^2$=2 with additive random noise (randn*0.01) is used as target. At each analysis scale, the variance of the target is estimated from a set of samples within: FIG. 5A ±0.1σ, FIG. 5B ±1.0σ, and FIG. 5C ±3.0σ. Dash lines: the ground-truth scale 503 (σ$^2$=2). Dot-Dash lines: the first-order estimates by Eq. (14) 501. Solid lines: the second-order estimates by Eq. (15) 502. "+" and "×" denote the most stable estimates by the first- and second-order methods, respectively.

Figure 6A:
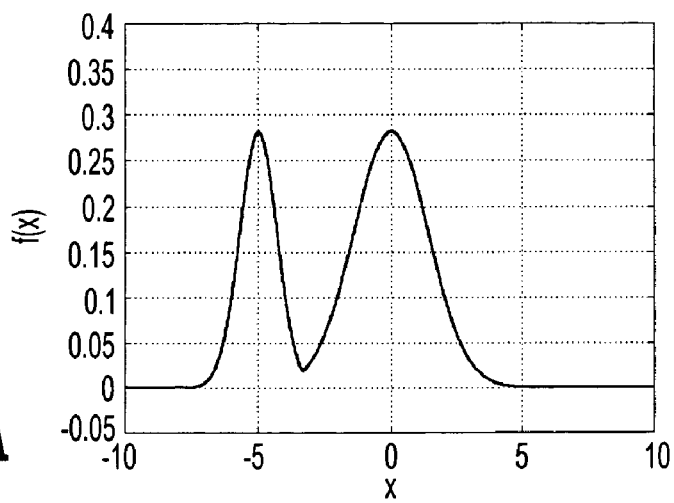
FIGS. 6A-C are graphs illustrating 1D synthetic data with noise according to an embodiment of the present disclosure.
Figure 6B:
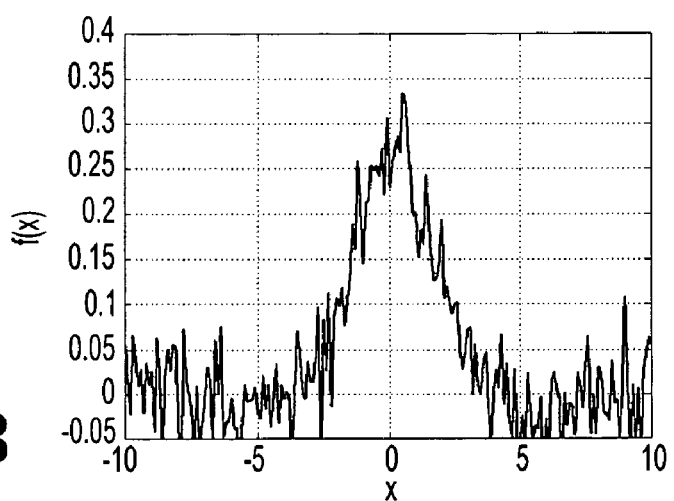
Figure 6C:
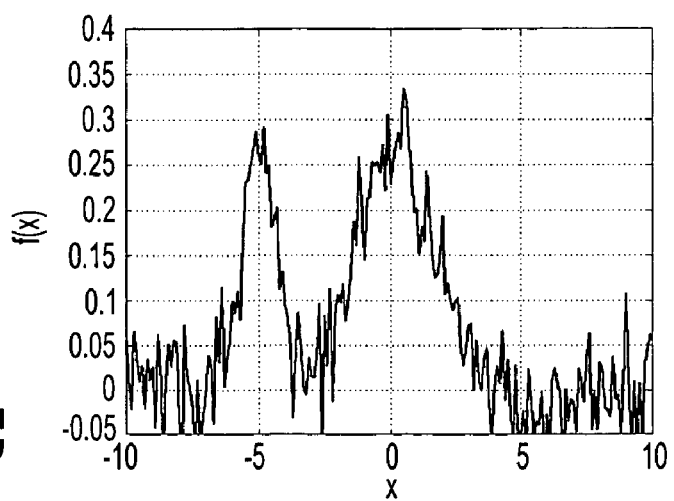

Scale selection methods according to an embodiment of the present invention have been studied with 1D synthetic data with the presence of noises. The target feature is the centered 1D Gaussian with σ$^2$=2. As shown in FIGS. 6A-C, three types of additive noise are used: FIG. 6A neighboring structure (a Gaussian centered at u=−5 with σ$^2$=0.5 superimposed to the target), FIG. 6B strong random noise (randn*0.04), FIG. 6C illustrates the data FIG. 6A with the same additive noise in FIG. 6B.

FIGS. 7A-C illustrate results achieved using maximum-over-scales criterion according to an embodiment of the present disclosure. The maximum-over-scales criterion is susceptible to the noises, the first-order methods are more sensitive to the random noise than the second-order methods, and the second-order methods are more sensitive to the neighboring structure than the first-order methods. These observations can be explained by the fact that the support of the Gaussian derivative kernels is larger for the higher order derivatives. Thus, the second-order methods are more sensitive to the neighboring structure or the signal truncation than the first-order method. The most accurate estimate obtained by the first-order method occurred when the data without the random noise were evaluated at points far from the non-target structure, as shown in FIG. 7A(i).

FIGS. 7A-C illustrate a variance estimation by the maximum-over-scales criterion for the signals shown in FIG. 6. FIGS. 7A(i), 7B(i) and 7C(i) illustrate the first-order method with Eq. (10). FIGS. 7A(ii), 7B(ii) and 7C(ii) illustrate the second-order method with Eq. (11). FIGS. 7A(iii), 7B(iii) and 7C(iii) illustrate the second-order method with Eq. (12). The legend is the same as FIG. 4.

Figure 9A:
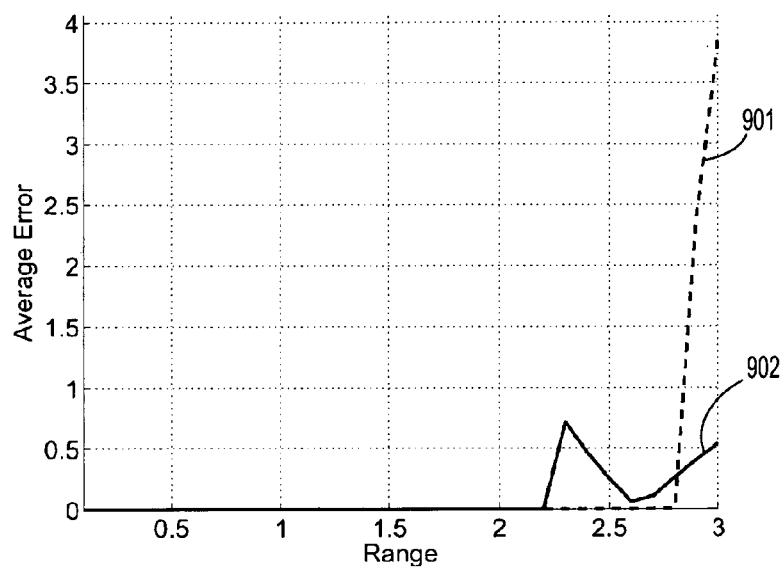
FIGS. 9A-C are graphs illustrating average variance estimation errors of a most-stable-over-scales method according to an embodiment of the present disclosure.
Figure 9B:
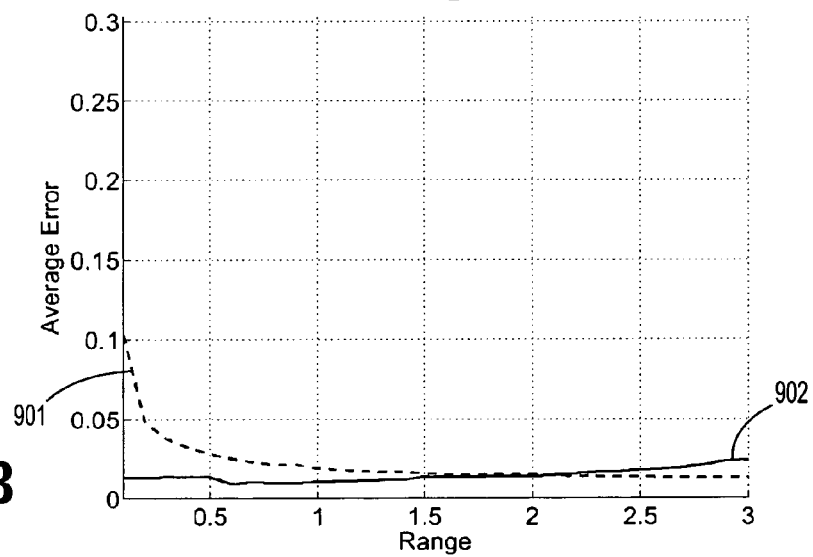
Figure 9C:
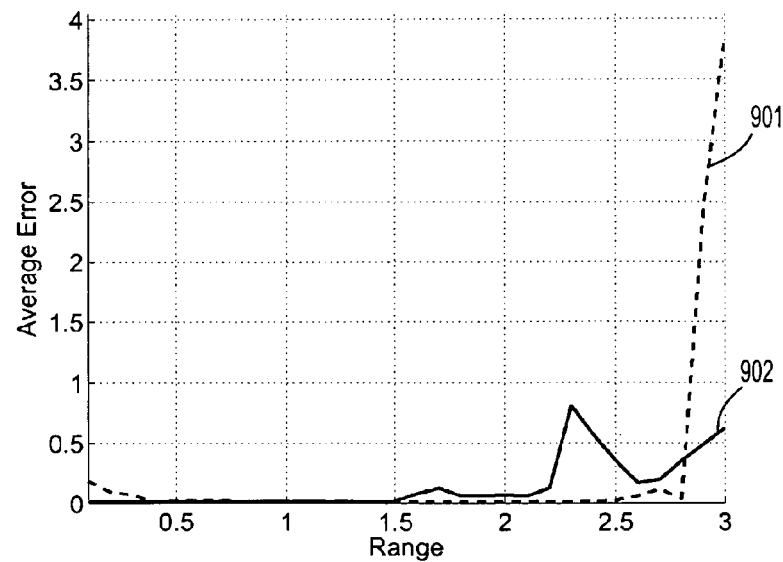

FIGS. 8A-C illustrate results achieved using most-stable-over-scales criterion according to an embodiment of the present disclosure. The first-order (dot lines 801) and second-order (solid lines 802) methods are compared by using the same data as FIGS. 7A-C. At each analysis scale, the target's variance is estimated from samples within three different sampling ranges: ±0.1σ, ±1.0σ, and ±2.0σ. The crosses "+" and "×" denote the estimates by the first- and second-order methods, respectively. The results demonstrate that the most-stable-over-scale criterion are more accurate than the maximum-over-scales criterion depending on the sampling range. For the data in FIGS. 8A(i)-(iii), both methods were accurate using only samples within the basin of attraction. For the data in FIGS. 8B(i)-(iii), the first-order (second-order) method gave better results with a larger (smaller) range. For the data in FIGS. 8C(i)-(iii), the second-order method with a very small sampling range was most accurate. The first-order estimate in FIG. 8B(i) and the second-order estimates in FIG. 8A(iii) and FIG. 8C(iii) were out of range. With the large sampling range, the scale estimates for data in FIGS. 8A(i)-(iii) and FIGS. 8C(i)-(iii) were corrupted because of the samples located near the edge of or out of the target's basin of attraction. The second-order method with the very small sampling range resulted in the overall best accuracy across the different types of noise. FIGS. 9A-C illustrate an average variance estimation errors of the most-stable-over-scales methods over 100 independent tests. The same types of data in FIGS. 6A-C with different random noise are used for each test. The errors are plotted against varying sampling ranges. Dot 901 and solid lines 902 denote errors by the first- and the second-order methods, respectively. The errors are plotted against continuously varying sampling ranges and compared with the aforementioned three data types. It demonstrates that both the first- and second-order methods achieve much higher accuracy than the maximum-over-scales criterion within the ±2.2σ sampling range that roughly corresponds to the target's basin of attraction. Also observed was a tendency that the first-order (second-order) method is more accurate with a larger (smaller) sampling range.

FIGS. 9A-C illustrate a variance estimation by the most-stable-over-scales methods for the signals in FIGS. 6A-C. At each analysis scale, the variance of the target is estimated from samples within: 1st row: ±0.1σ, 2nd row: ±1.0σ, 3rd row: ±2.0σ. The legend is the same as FIG. 2.

Figure 10A:
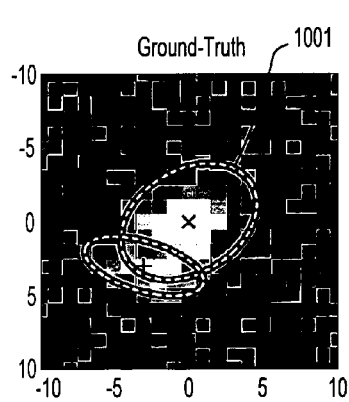
FIGS. 10A-H are images illustrating 2D synthetic data including a target and random noise according to an embodiment of the present disclosure.
Figure 10B:
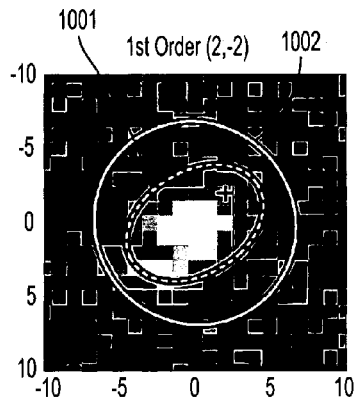
Figure 10C:
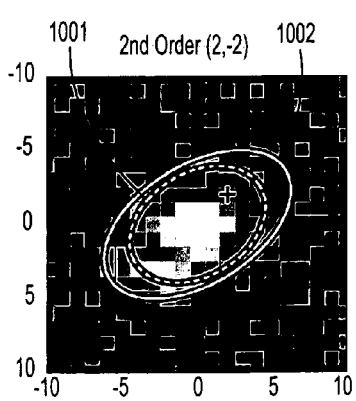
Figure 10D:
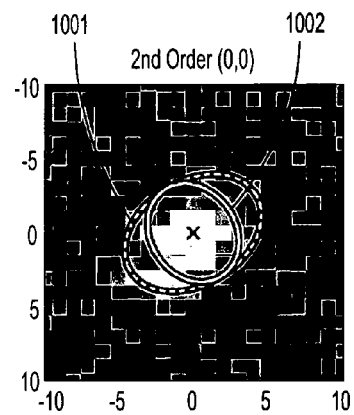
Figure 10E:
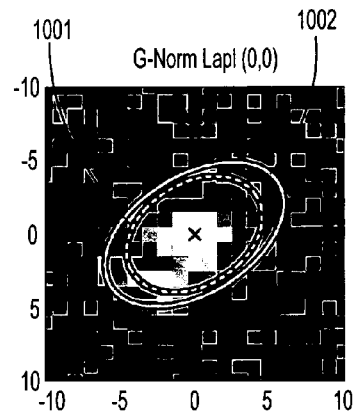
Figure 10F:
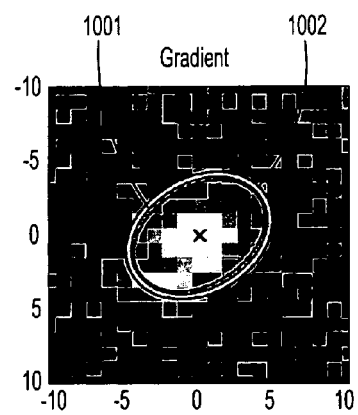
Figure 10G:
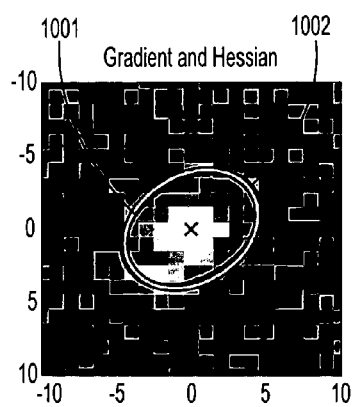
Figure 10H:
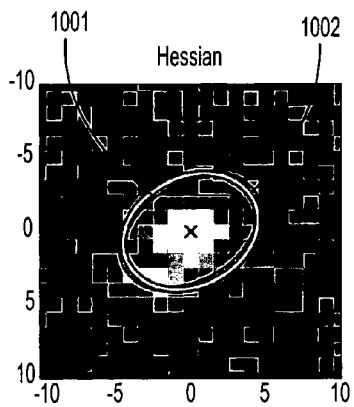
Figure 11A:
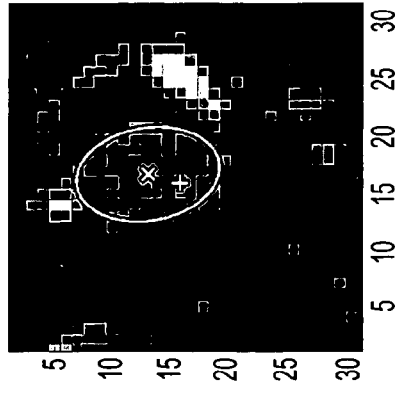
FIGS. 11A-H are images illustrating 3D spread estimations of lung tumors in 3D HRCT data using a most-stable-over-scales method according to an embodiment of the present disclosure.
Figure 11B:
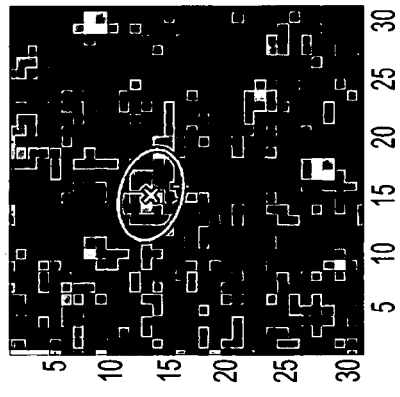
Figure 11C:
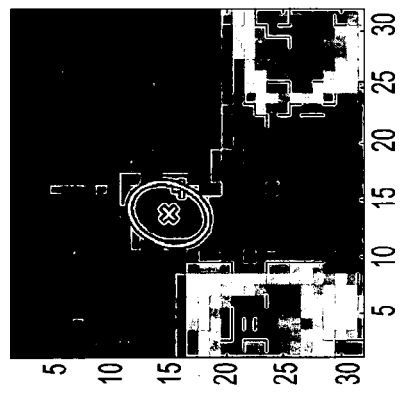
Figure 11D:
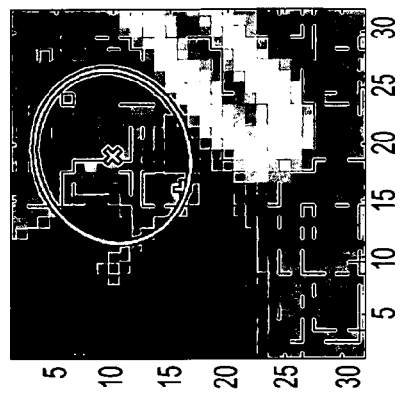
Figure 11E:
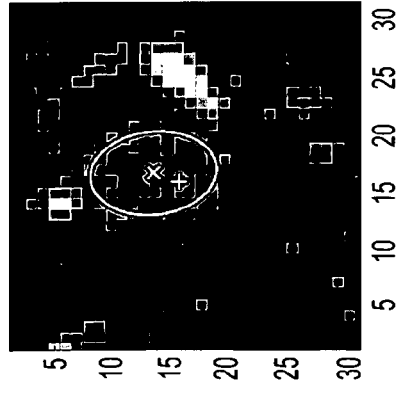
Figure 11F:
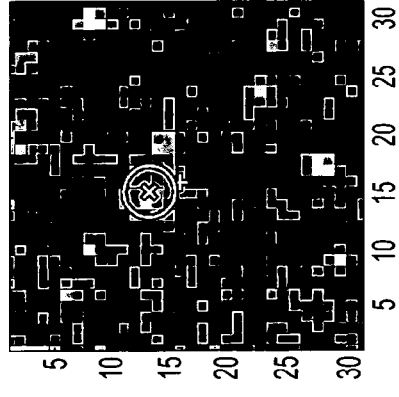
Figure 11G:
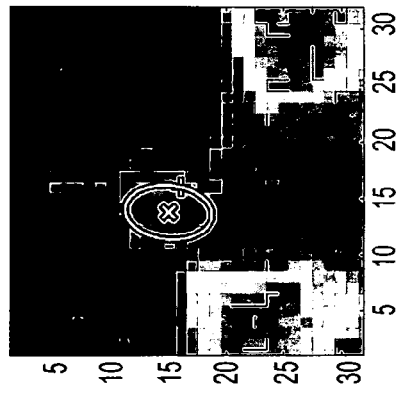
Figure 11H:
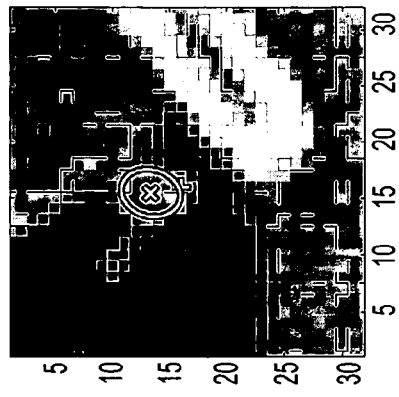

FIGS. 10A-H illustrate 2D examples comparing scale selection methods. The test data consists of a centered target Gaussian with additive random noise and a neighboring structure as shown in FIG. 10A. FIGS. 10B-E show results with the maximum-over-scales methods. A set of 144 analysis scale matrices were used sampled along the two eigenvectors of the ground-truth scale with the corresponding eigenvalues multiplied by (1, 2, ... 12). FIGS. 10F-H show results with the most-stable-over-scales methods. A set of 80 isotropic analysis scales were used from 0.1 to 8 with a 0.1 interval. One Mahalanobis distance is used as the sampling range. The results suggest that the most-stable-over-scales methods outperform the maximum-over-scales methods, confirming the finding from the 1D case. The three most-stable-over-scales methods resulted in similar accuracy. The second-order case (FIG. 10G) with both gradient and Hessian, however, gave the best accuracy in terms of the Frobenius norm of the error (0.69).

More particularly, examples with 2D synthetic data including a target centered Gaussian with a neighboring structure centered at (−3, 3) and additive random noise are shown in FIG. 10A. FIGS. 10B-E illustrate the maximum-over-scales methods. FIG. 10B shows a first-order method evaluated at (2, −2), FIG. 10C shows a second-order method at the non-maximum location, FIG. 10D shows a second-order method evaluated at (0, 0), FIG. 10E shows a γ-normalized Laplacian at the maximum location. FIGS. 10F-H illustrate the most-stable-over-scales methods. FIG. 10F shows a first-order method, FIG. 10G shows a second-order gradient and Hessian method, FIG. 10H shows a second-order Hessian only method. The ground-truth and scale estimates are denoted by 90% confidence ellipses with dash (1001) and solid lines (1002), respectively.

3D implementations of the most-stable-over-scales methods are applied to the problem of estimating anisotropic spreads of pulmonary tumors shown in high-resolution computed tomography (HRCT) images of lung tissue. Each volumetric image consists of 12-bit positive values over an array of 512×512 lattices. The first-order and the second-order (Hessian only) methods have been compared. For both methods, a set of 18 isotropic analysis scales $h=(0.50^2, 0.75^2, \ldots, 4.75^2)$ are used. The locations of the local spatial maxima u(h) are estimated by using the mean shift-based mode seeking method with the extended mean shift vector. Markers indicating rough tumor locations are given a priori. The convergence point of the majority of data points sampled around the marker provides the spatial maximum estimate u(h). The neighborhood width of the divergence formula is set to a=1. The system is implemented in C language and process a 32-voxel volume-of-interest by an average of two seconds with a 2.4 GHz Intel CPU.

HRCT data of 14 patients displaying the total of 77 pulmonary tumors were used for this evaluation. The second-order method resulted in less failures (10 cases) than the first-order method (14 cases). All the solitary tumors were correctly estimated by both methods. Most of the failures were due to small nodules that are attached to the lung wall (on-the-wall).

Examples of the 3D spread estimation of lung tumors in 3D HRCT data by using the most-stable-over-scales scale selection methods are shown in FIGS. 11A-H. FIGS. 11A-D show the results of first-order methods. FIGS. 11E-H show those of second-order (Hessian only) methods. "+" denotes the marker locations. The local spatial maxima and 3D spread estimates are denoted by "×" and 2D intersections of 50% confidence ellipsoids, respectively. Both methods resulted in similar estimates (e.g., FIGS. 11A-E and FIGS. 11C-G). However, second-order methods provided more accurate spread estimates in some cases (e.g., FIGS. 11B-F). Furthermore, some cases failed by the first-order method were correctly estimated by the second-order method.

A unified approach for treating the scale selection problem in the anisotropic scale-space has been presented for evaluating local Gaussian-like structures resulting in a number of the first- and second-order determinations. The maximum-over-scales criterion with the L-normalized anisotropic scale-space derivatives offers elegant scale selection determinations with the constant γ value, exploiting the analytical simplicity of the Gaussian function. For realistic application scenarios with the presence of noise, experimental results demonstrate that the second-order most-stable-over-scales methods with the isotropic scale-space outperform others.

Having described embodiments for a system and method for treating a scale selection problem in the anisotropic scale-space, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable medium embodying instructions executable by a processor to perform method steps for determining a structure in volumetric data, the method steps comprising:
- determining an anisotropic scale-space for a local region around a given spatial local maximum;
- determining L-normalized scale-space derivatives in the anisotropic scale-space; and
- determining the presence of noise in the volumetric data, upon determining noise in the volumetric data, determining the structure by a most-stable-over-scales determination, and upon determining noise below a desirable level, determining the structure by one of the most-stable-over-scales determination and a maximum-over-scales determination according to a size of a sampling range, wherein the maximum-over-scales is used when the sampling range is greater than a basin of attraction a spatial local maximum.

2. The method of claim 1, wherein the most-stable-over-scales determination comprises:
- determining a plurality of covariance estimates over an analysis scale set; and
- determining a covariance estimate from among the plurality of covariance estimates having a minimum Jensen-Shannon divergence, wherein the covariance estimate defines a spread of the structure and the structure is determined in the volumetric data corresponding to the spread.

3. The method of claim 2, wherein the analysis scale set is a given set of bandwidths over the volumetric data.

4. The method of claim 1, wherein the a maximum-over-scales determination comprises:
- determining Gamma- and L-normalized scale-space derivatives over an analysis scale set;
- selecting a scale having a maximum normalized scale-space derivative, wherein the scale is a covariance defining a spread of the structure and the structure is determined in the volumetric data corresponding to the spread.

5. The method of claim 4, wherein the Gamma- and L-normalized scale-space derivatives are determined with a constant normal having a Gamma- equal to ½.

6. The method of claim 4, wherein the analysis scale set is a given set of bandwidths over the volumetric data.

7. The method of claim 1, wherein the spatial local maximum indicates a location of the structure in the volumetric data.

* * * * *

UNITED STATES PATENT AND TRADEMARK OFFICE
CERTIFICATE OF CORRECTION

PATENT NO.       : 7,616,792 B2                          Page 1 of 1
APPLICATION NO. : 10/990888
DATED            : November 10, 2009
INVENTOR(S)      : Okada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1393 days.

Signed and Sealed this

Nineteenth Day of October, 2010

David J. Kappos
*Director of the United States Patent and Trademark Office*